United States Patent [19]

Nakamura et al.

[11] Patent Number: 4,992,715

[45] Date of Patent: Feb. 12, 1991

[54] TORQUE CONTROL APPARATUS FOR ROTATING MOTOR MACHINE

[75] Inventors: Mitsuru Nakamura; Yozo Nakamura; Yuzo Kadomukai, all of Ibaraki; Tsunehiro Endo, Hitachiota; Kenichi Iizuka, Ashikaga; Hiroaki Hata, Tochigi, all of Japan

[73] Assignee: Hitachi, Ltd., Tokyo, Japan

[21] Appl. No.: 227,717

[22] Filed: Aug. 3, 1988

[30] Foreign Application Priority Data

Aug. 4, 1987 [JP] Japan .................. 62-194613

[51] Int. Cl.⁵ .................................. H02P 5/28
[52] U.S. Cl. ...................... 318/649; 318/611;
318/798; 318/432; 318/433; 417/22; 417/42
[58] Field of Search ................. 318/561-573,
318/332, 254, 327, 328, 338, 430, 395, 396, 397,
398, 615, 616, 617, 618, 431, 432, 433, 434, 689,
800, 803, 811, 721, 722, 798, 799, 805, 806, 807,
808, 812

[56] References Cited

U.S. PATENT DOCUMENTS

| | | | |
|---|---|---|---|
| 4,075,538 | 2/1978 | Plunkett | 318/52 |
| 4,182,979 | 1/1980 | Douglas et al. | 318/434 |
| 4,223,261 | 9/1980 | White | 318/722 X |
| 4,230,979 | 10/1980 | Espelage et al. | 318/722 X |
| 4,240,020 | 12/1980 | Okuyama et al. | 318/721 |
| 4,280,085 | 7/1981 | Cutler et al. | 318/798 X |
| 4,287,463 | 9/1981 | Walker et al. | 318/798 X |
| 4,311,951 | 1/1982 | Walker et al. | 318/808 X |
| 4,511,834 | 4/1985 | Studtmann | 318/722 X |
| 4,556,830 | 12/1985 | Schwalm et al. | 318/434 X |
| 4,649,328 | 3/1987 | Leonard et al. | 318/327 X |
| 4,651,073 | 3/1987 | Shimizu et al. | 318/611 X |
| 4,726,738 | 2/1988 | Nakamura et al. | 318/798 X |
| 4,736,143 | 4/1988 | Nakamura et al. | 318/432 |
| 4,767,976 | 8/1988 | Mutoh et al. | 318/808 |
| 4,803,409 | 2/1989 | Horikawa | 318/649 X |
| 4,808,903 | 2/1989 | Matsui et al. | 318/808 X |
| 4,814,678 | 3/1989 | Omae et al. | 318/434 X |

Primary Examiner—Paul Ip
Attorney, Agent, or Firm—Antonelli, Terry, Stout & Kraus

[57] ABSTRACT

A torque control unit rotates a motor machine having a motor element and a load element. The load element is coupled to the motor element via a rotational main shaft and driven to rotate by the motor element. Rotational acceleration at each rotation angle during one revolution of the rotational main shaft is detected and fed back. An electromagnetic torque of the motor element is controlled so that a difference between the electromagnetic torque of the motor element and a load torque of the load element may become zero at each rotation angle of the rotational main shaft.

13 Claims, 19 Drawing Sheets

FIRST METHOD

SECOND METHOD

TORQUE CONTROL APPARATUS FOR ROTATING MOTOR MACHINE

BACKGROUND OF THE INVENTION

1. Field of the Invention

The present invention relates in general to a rotating motor machine in which a load element is driven by a motor element, and in particular to a torque control apparatus suitable for reducing the vibration of a rotating motor machine.

2. Description of the Prior Art

As an example of a rotating machine driven by a motor element, an enclosed rotary compressor will now be described. FIG. 16 is a longitudinal section view showing the conventional structure of an enclosed rotary compressor. FIG. 17 is a cross sectional view seen along a line XVII-XVII of FIG. 16. In FIGS. 16 and 17, numeral 1 denotes a compressor case housing a motor element and a compression element therein. Numeral 2 denotes a stator of the motor element fixed to the internal circumference of the case 1. Inside the stator 2, a rotor 3 of the motor element fitted to a main shaft 4 so as to rotate together therewith is disposed. The main shaft 4 is supported by main bearing and terminal bearing 6. The bearing 5 and 6 are coupled to a cylinder block 7. The cylinder block 7 is fixed to the case 1. The cylinder block 7 is fixed to the case 1. A compression space 12 is formed within the cylinder block 7. In the compression space 12, a roller 8 which is integral with the main shaft 4 is so disposed as to be eccentric. A vane 9 is so disposed as to be pressed against to the surface of the roller 8 by spring 10. These constitute the compression element. When the main shaft is driven to rotate by the above described motor element under such configuration, coolant gas is sucked from a suction accumulator 11 disposed outside the case 1, pressurized to a predetermined pressure in the compression space 12 by the roller 8, and discharged out of the case along the direction indicated by arrows. A rotary compressor having such a structure is disclosed in JP-A-58-187635.

In a compresser having such a structure, the gas suction torque in the compression element changes greatly during one revolution of the main shaft 4, whereas the motor element outputs a nearly constant torque with respect to time. The difference between the gas suction torque and the electromagnetic torque, i.e., the residual torque serves as an exciting torque with respect to the case 1. In the compressor as a whole, large vibration is induced in the rotation direction, resulting in a problem.

FIG. 18 schematically shows a cause of vibration generation in a rotary compressor as an example. With respect to a rotating side (the rotor 3, the roller 8 and the main shaft 4) and a stationary side (the stator 2, the block 7 and the container 1) of the compression element and the motor element, a gas compression torque $T_G$ and the electromagnetic torque $T_M$ function as illustrated in FIG. 18. In FIG. 18, the clockwise direction is represented by the plus sign and the counterclockwise direction is represented by the negative sign. At this time, equations of motion of the rotating side and the stationary side are represented as $$J_R \frac{d^2\phi_R}{dt^2} = T_G - T_M \quad (1)$$

and $$J_S \frac{d^2\phi_R}{dt^2} + K\phi_S = T_M - T_G \quad (2)$$

where $J_R \frac{d^2\phi_R}{dt^2}$ and $J_S \frac{d^2\phi_S}{dt^2}$ are respectively inertia torques of the rotating side and the stationary side, $J_R$ and $J_S$ are respectively inertia moments of the rotating side and the stationary side, $T_G$-$T_M$ is equivalent to the residual torque (=excitation torque), K is a spring constant of the spring for supporting the compressor, and $\phi_R$ is a rotation angle of the rotating side, which is related to the rotational angular speed $w_R$ of the rotating side as $$\omega_R = \frac{d\phi_R}{dt}.$$

If the rotational speed $w_R$ of the rotating side is detected and feedback control is so performed that the rotational speed $w_R$ may always be equal to a constant commanded value of the rotational speed, therefore, it follows that $$\frac{d\omega_R}{dt} = 0.$$

From the equation (1), therefore, the relation $T_M-T_G=0$ is satisfied. Since the electromagnetic torque $T_M$ thus balances the load torque $T_G$, the excitation torque in the equation (2) is eliminated. As a result, it becomes possible to suppress the vibration of the case in the rotation direction which might cause vibration and noise of the rotating machine.

As described in JP-A-62-83530, the load torque $T_G$ of the compressor changes very largely during one revolution. However, the load is a periodically pulsating load repeated with a period of one revolution. If attention is paid to a particular rotation angle, the load torque value at that rotation angle does not significantly change. Paying attention to this fact, the rotational speed detected at each rotation angle is fed back at the same angle appearing after one revolution to perform the torque control in an example of the prior art described in JP-A-62-83530.

In general, however, the variation curve of the rotational speed and the variation curve of the load torque $T_G$ differ from each other in phase. FIG. 19 shows a load torque curve of a rotary compressor together with a rotational speed variation curve of a rotor. As evident from FIG. 19, the rotational speed varies with a lag phase with respect to the torque variation. The point where the rotational speed becomes the minimum is several ten degrees behind the peak value of the load torque.

In the above described torque control comprising the steps of detecting the rotational speed of a rotor, increasing the motor output when the detected speed is smaller than the commanded speed, and decreasing the motor output when the detected speed is larger than the commanded speed, therefore, it is not possible to completely synchronize the motor output torque to the load torque because of the above described phase lag. Because of this problem, some phase compensation means is neeeded.

As described below, however, it is difficult to attain this phase compensation. That is to say, the torque component of a rotary compressor includes harmonic components such as the second harmonic and the third harmonic in addition to the primary component of rotation corresponding to the running frequency of the compressor as shown in FIG. 20. The harmonic components have constant phase differences from each other. As indicated by the equation (1), the rotational speed $W_R$ is related to the excitation torque $\Delta T_r$ by integration. The rotational n-th component $\Delta T_n$ of the excitation torque will now be considered. By integrating the relation $\Delta T_n = \Delta T_{no} \sin n\omega t$, we obtain $$\int \Delta T_n dt \propto -\cos n\omega t = \sin\left(\omega t - \frac{\pi}{2n}\right).$$

Therefore, it is understood that the n-th component of the rotational speed is $2n/\pi$ behind in phase the n-th component of the torque. The actual rotational speed of the rotor is equal to the result obtained by synthesizing all of these n-th components. Further, ratios of these components depend upon the running condition. Accordingly, the optimum phase compensation angle cannot be simply defined, resulting in a problem.

SUMMARY OF THE INVENTION

In view of the above described problems, the present invention has been obtained. An object of the present invention is to provide a torque control apparatus for a rotating motor machine capable of synchronizing the motor output torque to the load torque without causing phase lag at each rotation angle of the rotor, eliminating the excitation torque, and attaining lower vibration surely and rapidly.

In accordance with a feature of the present invention, in a torque control apparatus for rotating motor machine comprising a motor element and a load element coupled to the motor element via a rotational main shaft and driven by the motor element so as to rotate, the rotational acceleration at each rotation angle in one revolution of the rotational main shaft is detected and fed back, and the electromagnetic torque of the motor element is so controlled that the difference between the electromagnetic torque of the motor element and the load torque of the load element may become zero at each rotation angle of the rotational main shaft.

The rotational acceleration $$\omega_R = \frac{d^2\phi_R}{dt^2}$$

by differentiating the rotational speed has a value reflecting the magnitude of the torque variation and changes in phase with respect to the torque variation. Since the present invention uses this rotational acceleration, the phase correction described before in "Description of the Prior Art" is not needed.

In accordance with the present invention, the controlled variable required to make the excitation torque zero is calculated from the rotational acceleration at each rotation angle position. It is thus possible to make the output torque of the motor element track the variation of the load torque at each rotation angle without a phase delay. As a result, the excitation torque can be made small surely and rapidly.

DESCRIPTION OF THE PREFERRED EMBODIMENTS

Figure 2:
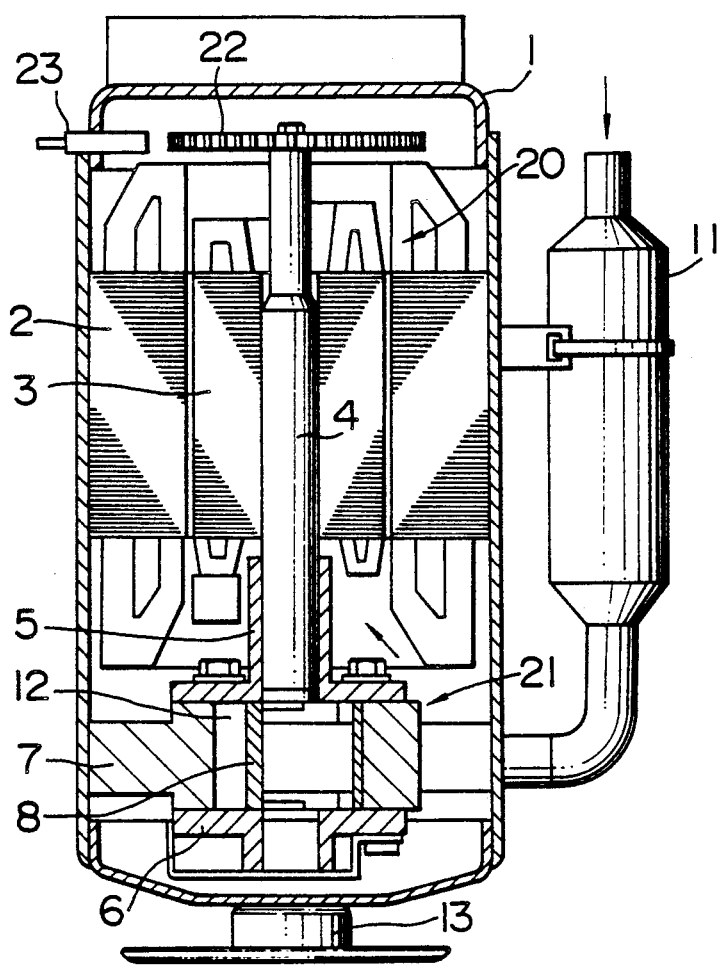
FIG. 2 is a longitudinal section view of a compressor according to an embodiment of the present invention.
Figure 16:
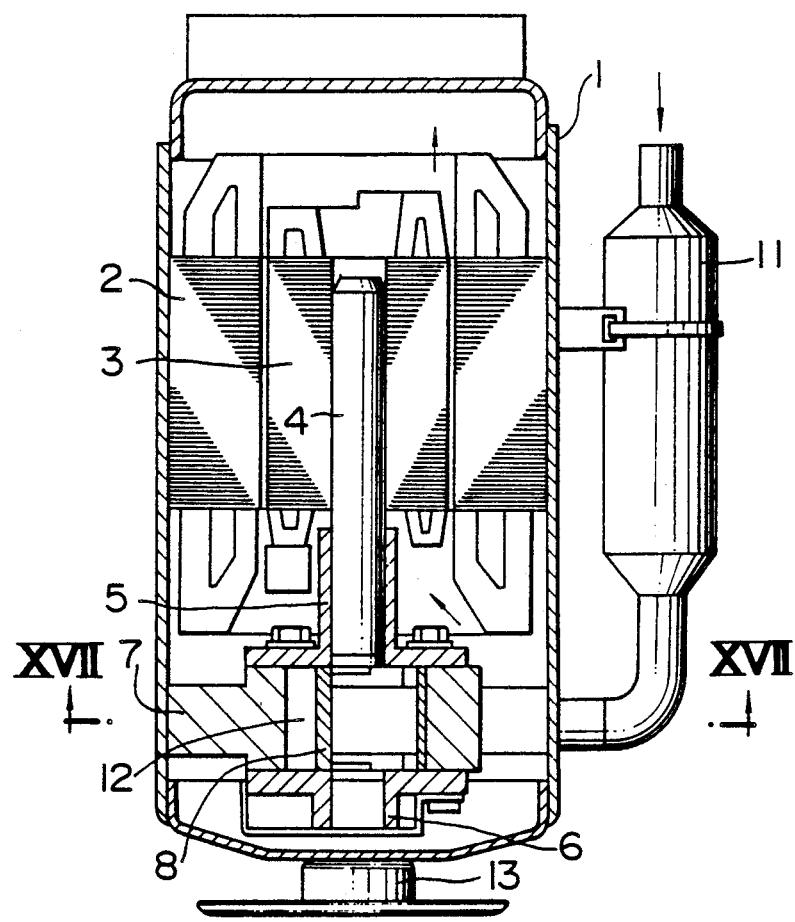
FIG. 16 is a longitudinal section view of a conventional compressor.
Figure 17:
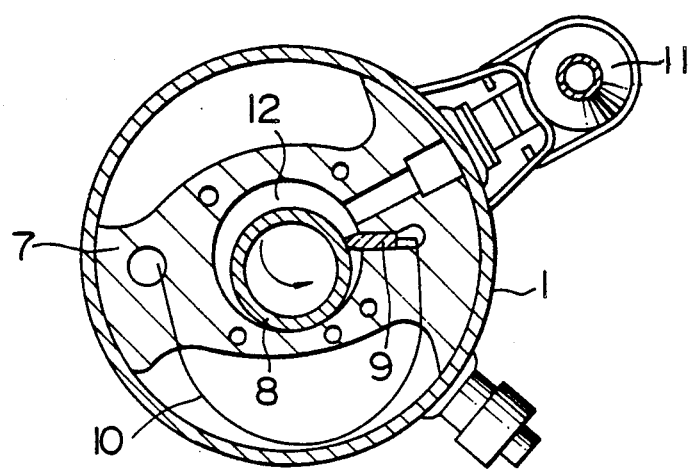
FIG. 17 is a cross sectional view of the compressor of FIG. 16 seen along a line XVII—XVII
Figure 18:
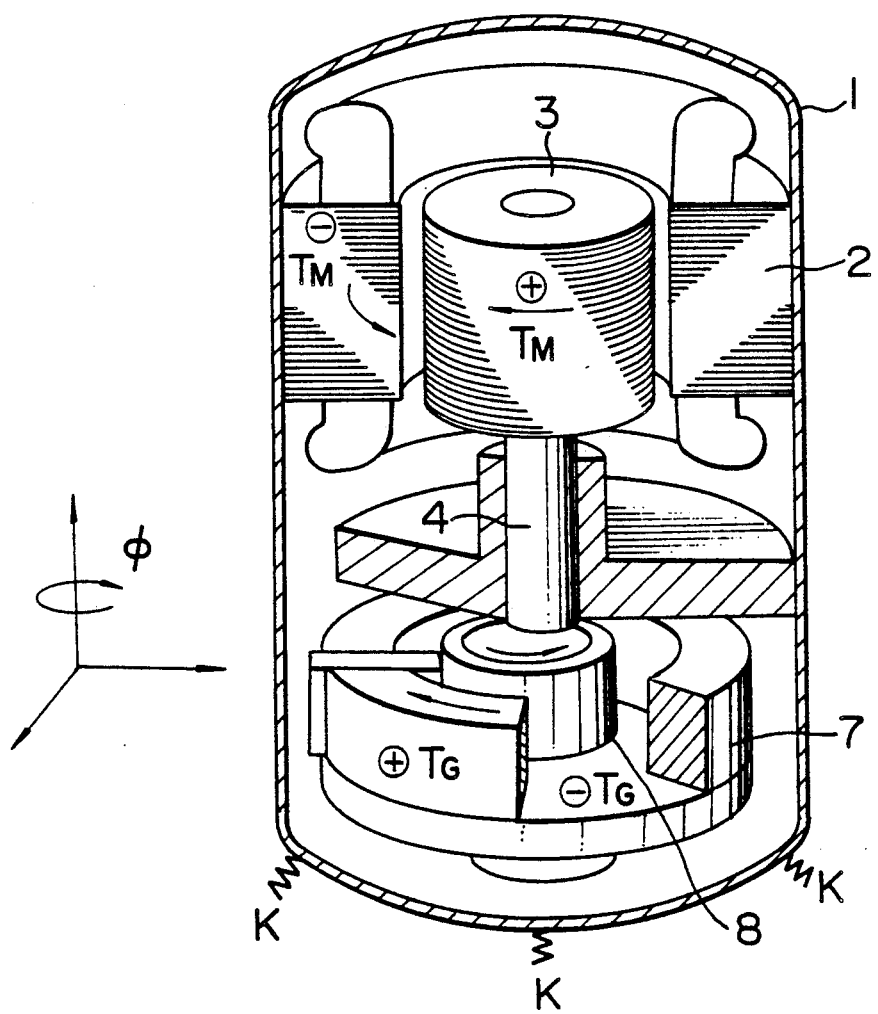
FIG. 18 shows torques generated in a compressor.
Figure 19:
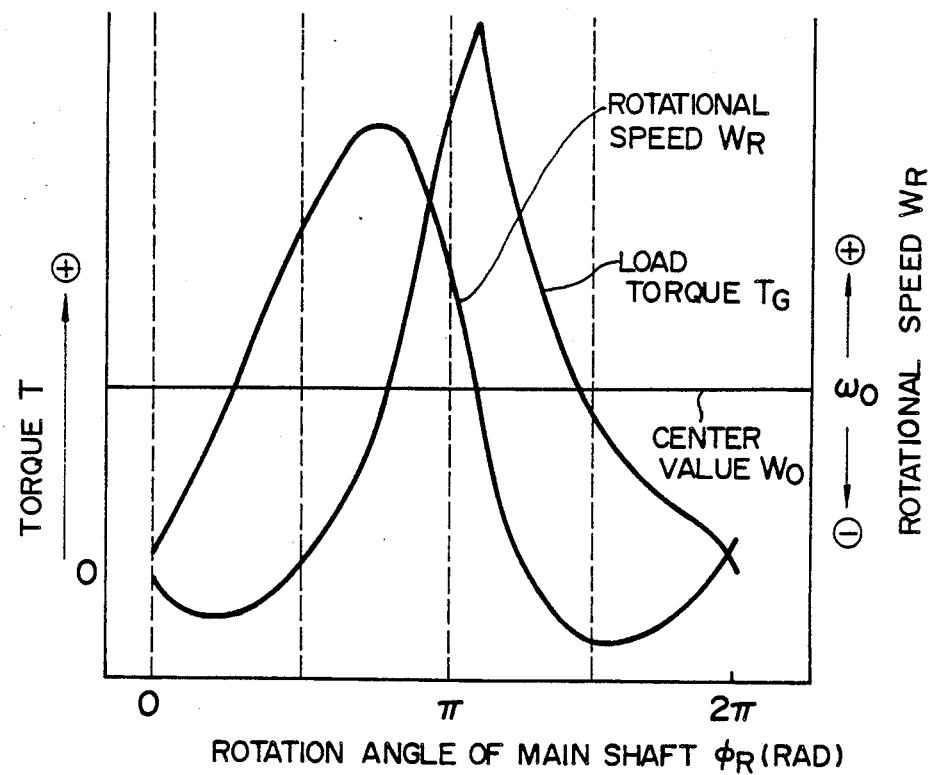
FIG. 19 shows variation of the torque and rotational speed appearing during one revolution.
Figure 20:
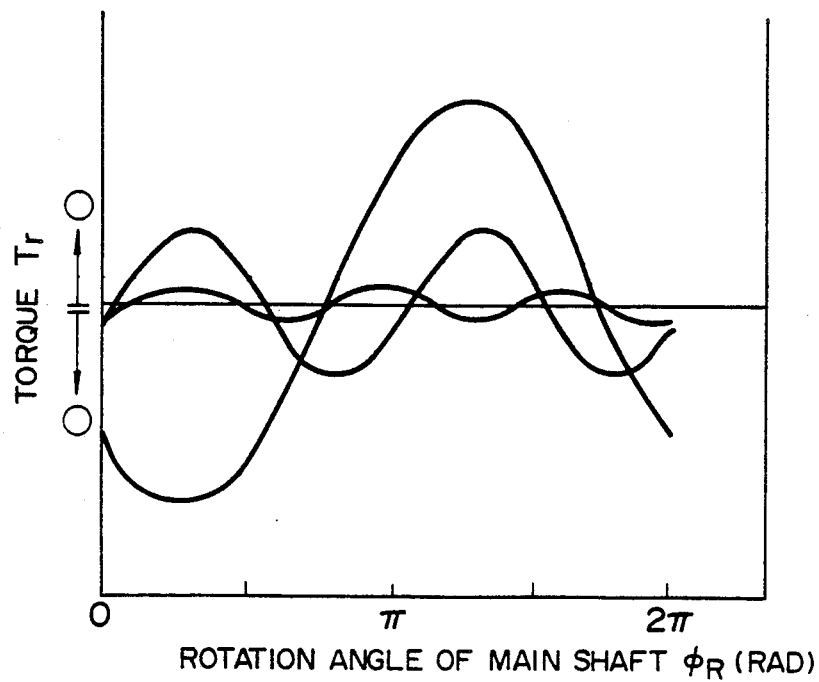
FIG. 20 shows rotation degree components of the toruqe waveform.

Embodiments in which the present invention is applied to the case where a rotary compressor, which is a kind of rotating machine driven by a motor element, is driven by an inverter will now be described. FIG. 2 shows a compressor according to the present embodiment. This compressor has almost the same structure as that of a conventional compressor shown in FIGS. 16 and 17. Accordingly, only different portions will be described. Identical portions are denoted by identical numerals and will not be described.

In FIG. 2, one end of a rotational main shaft 4 directly connecting a rotor 3 of a motor element 20 with a roller 8 of a compression element 21 is prolonged. A toothed gear 22, which is a member for delecting the rotation position, is fixed to the prolonged end of the rotational main shaft 4. The toothed gear 22 and the main shaft 4 are rotated as one body. A position detection sensor 23 such as an electromagnetic pickup gap sensor is fixed to a container 1. The position detection sensor 23 senses the tooth train of the toothed gear 22 and outputs a sinusoidal signal depending upon the rotation angle position of the main shaft 4.

Figure 3A:
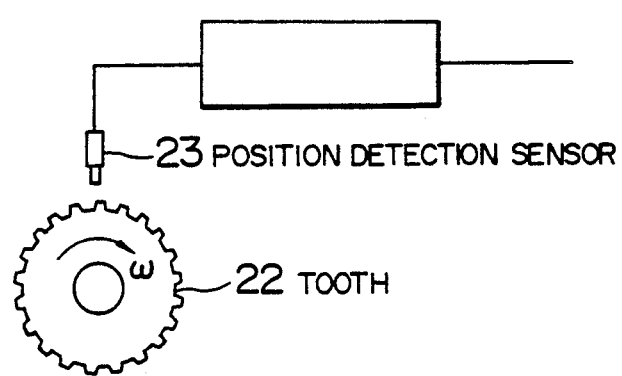
FIGS. 3A to 3E show a method for obtaining the rotational speed and the rotational acceleration from a rotation detection signal.
Figure 3B:
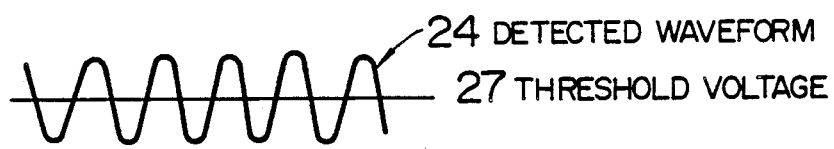
Figure 3C:
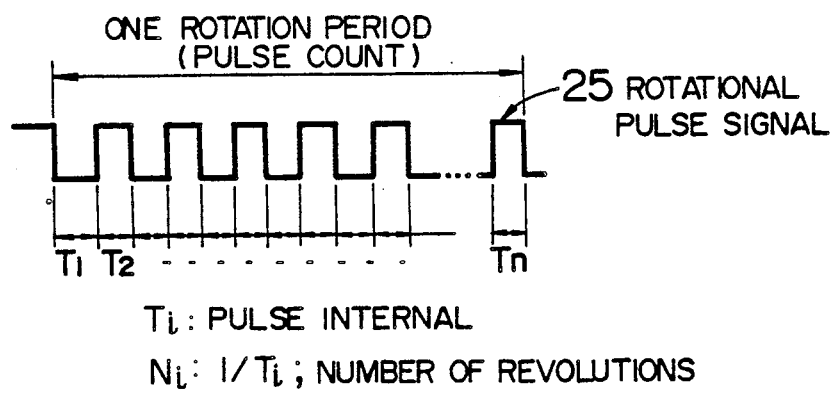
Figure 3D:
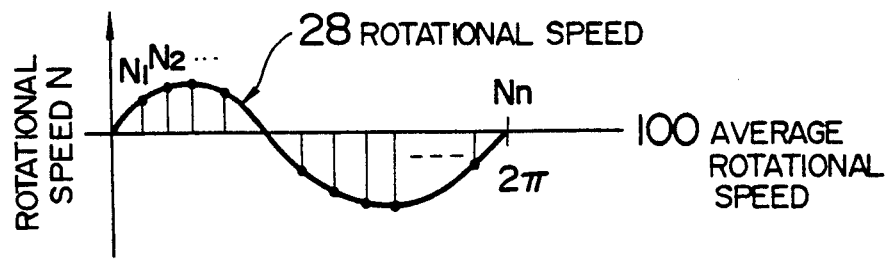
Figure 3E:
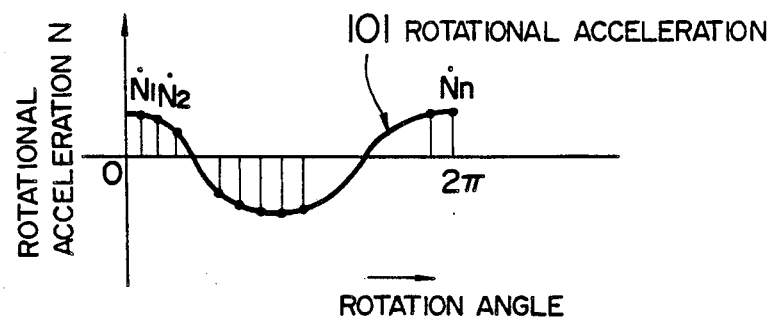

FIGS. 3A to 3E show a series of processing steps for deriving the rotational speed and the rotational acceleration of the rotational main shaft 4 from the sinusoidal signal detected by the position detection sensor 23. If the toothed gear 22 rotates as illustrated in FIG. 3A, a detected sinusoidal waveform 24 as shown in FIG. 3B is outputted from the position detection sensor 23. By applying waveform shaping to the detected waveform 24 with respect to threshold voltage 27 used as reference and converting the resultant waveform into a pulse train, a rotational pulse signal 25 as shown in FIG. 3C is obtained. Pulse widths $T_1, T_2, \ldots, T_n$ of this pulse time train 25 are measured. The rotational speed $N_i$ at each time is derived as the reciprocal $N_i = 1/T_i$. Rotational speed 28 at respective rotation angles in one revolution is shown in FIG. 3D. On the other hand, the rotational acceleration $\dot{N}_i$ at each time is obtained as $\dot{N}_i = (N_i - N_{i-1})/T_i$ from the rotational speed $N_i$ of the rotational pulse signal 25 at pulse i and the rotational speed $N_{i-1}$ at pulse (i−1). Or the rotational acceleration can also be obtained by the relation $\dot{N}_i = (N_{i+1})/(T_i + T_{i+1})$ after the rotational speed $N_{i+1}$ at pulse (i+1) has been obtained. Otherwise, the rotational acceleration $\dot{N}_i$ can also be derived by applying interpolation to three points $N_{i-1}$, $N_i$ and $N_{i+1}$ in the same way. FIG. 3E shows rotational acceleration 101 at respective rotation angles in one revolution.

Figure 4:
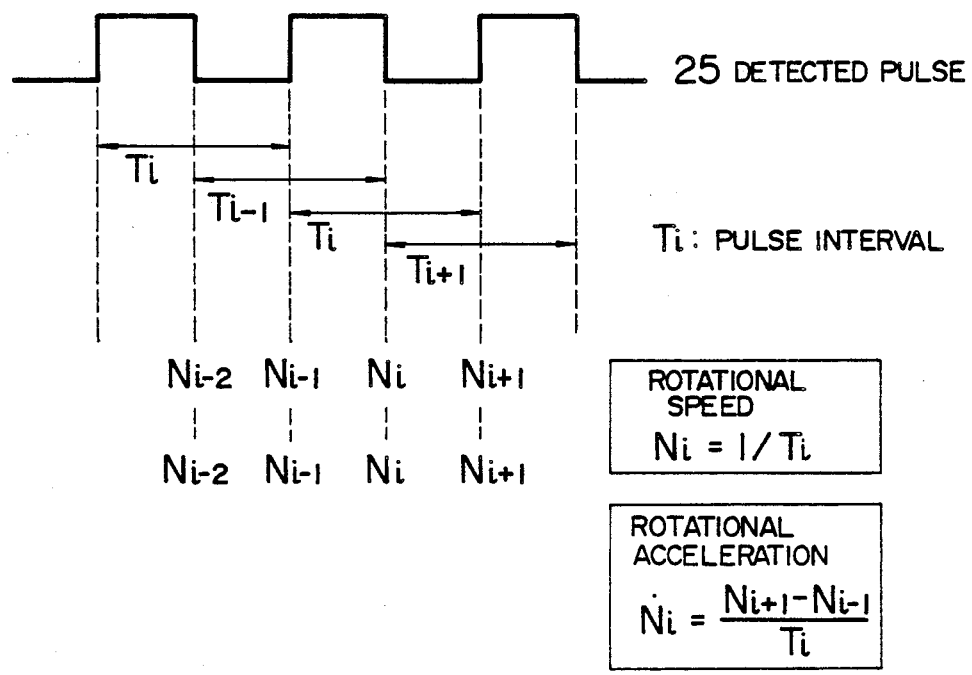
FIG. 4 shows another method for calculating the rotational speed and the rotational acceleration from detected pulses.

FIG. 4 shows a different method for calculating the rotational speed and the rotational acceleration from detected pulses. The pulse width of the detected pulse 25 is measured at intervals of one period, and respective pulse widths $T_1, T_2, \ldots, T_i$ are measured while measuring positions are shifted half period by half period. The rotational speed at each point is derived by the relation $N_i = 1/T_i$. And the rotational acceleration can be derived from adjacent speeds $N_{i-1}$ and $N_{i+1}$ and the pulse width $T_i$ by using the relation $\dot{N}_i = (N_{i+1} - N_{i-1})/T_i$.

Figure 5:
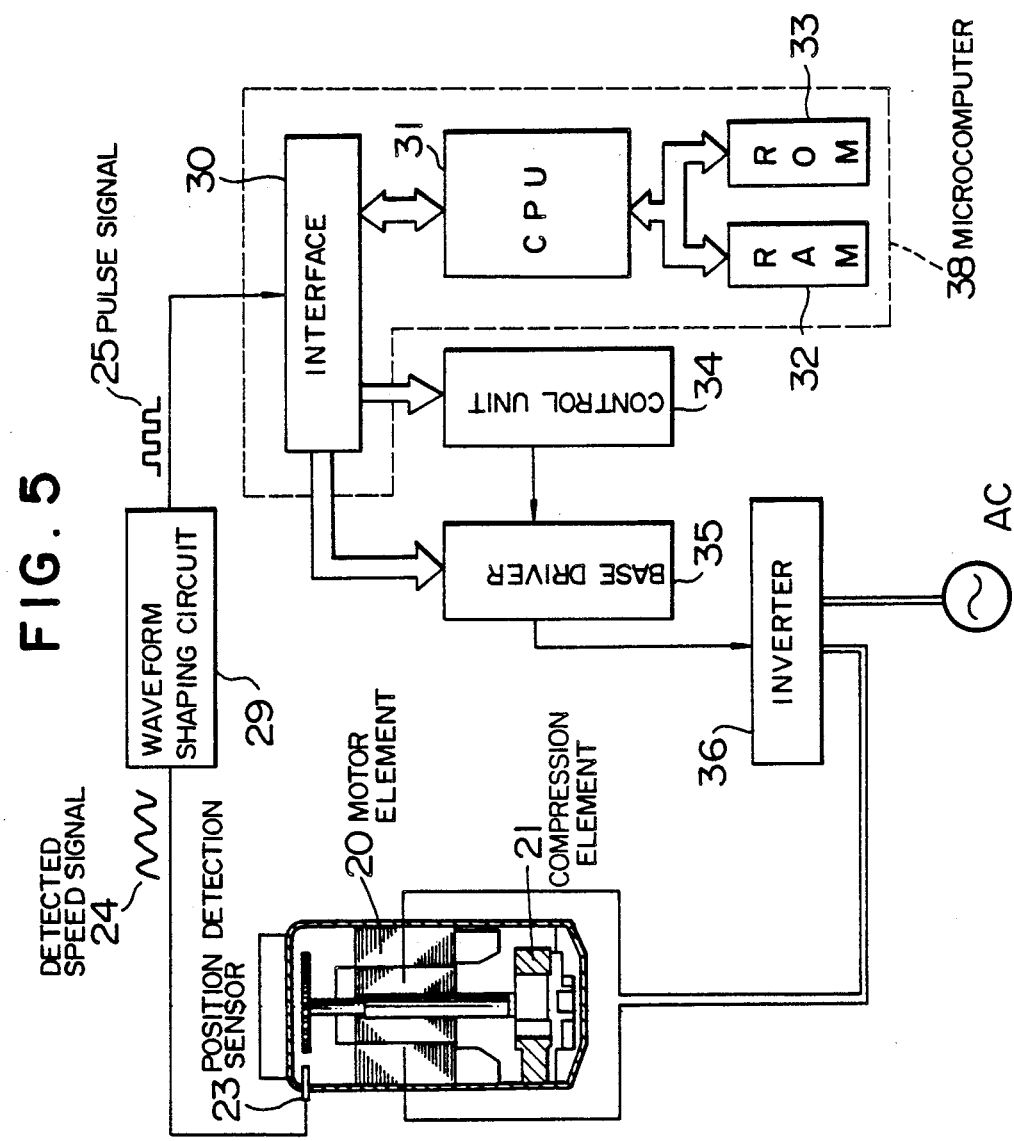
FIG. 5 is a schematic configuration diagram of a torque control apparatus according to an embodiment of the present invention.

FIG. 5 shows the whole configuration of a torque control apparatus of the present embodiment. That is to say, the detected signal 24 obtained in the position detection sensor 23 is converted into the rotational pulse signal 25 by a waveform shaping circuit 29. The rotational pulse signal is sent to a CPU 31 within a microcomputer 38 via an interface 30. Upon the appearance of the rotational pulse signal 25, the microcomputer 38 starts interruption and carries out a series of operation comprising detection, calculation and commanding. The microcomputer 38 clocks the pulse interval of the rotational pulse signal 25 by using a timer contained in the microcomputer, derives the above described time interval $T_i$, and calculates the rotational speed $N_i$ and the rotational acceleration $\dot{N}_i$ therefrom. And the microcomputer 38 calculates and outputs a commanded current value to be supplied to the motor element 20 of the compressor, which is required to make the rotational acceleration $\dot{N}_i$ equal to zero and make the rotational speed $\dot{N}_i$ equal to the commanded speed $N_c$. This control signal is sent to a control unit 34 to produce a chopper signal for driving a base driver 35. On the basis of the current control operation of a base driver 35, an inverter 36 controls a winding current to be supplied to the motor element 20, torque control being performed. The control is continuously performed so that the rotational speed of the compressor may always be equal to the commanded speed with variation less than a certain allowance and the rotational acceleration of the rotor may be minimum at each rotation angle. A series of these control loops are written into a ROM 33 beforehand.

Figure 1:
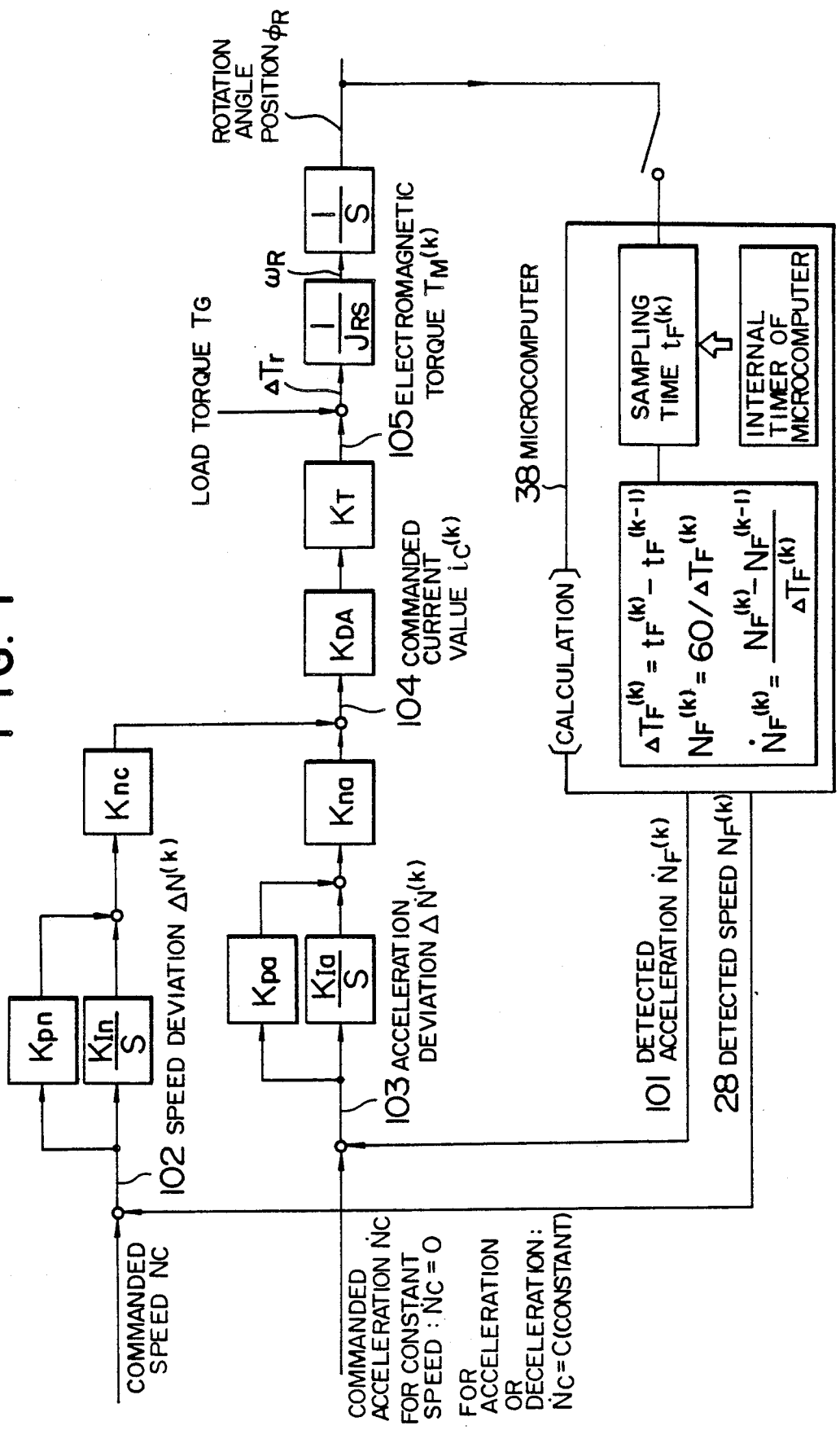
FIG. 1 is a control block diagram of an embodiment of the present invention.

The control flow of this torque control apparatus will now be described in detail by referring to a block diagram shown in FIG. 1. In FIG. 1, S denotes a Laplace operator, and 1/S denotes an integral element. The load torque $T_G$ of the compressor functions as disturbance with respect to an electromagnetic torque $T_M$ (105) of the motor element. The residual torque $T_M - T_G = \Delta T_r$ becomes the excitation torque. The rotational speed $\omega_R$ varies in accordance with the relation $$\omega_R = \frac{1}{J_R S} \Delta T_r.$$

Time $t_R^{(k)}$ of pulse k of the above described rotational pulse signal 25, which is obtained by sampling the rotation angle position $\phi_R$ of the rotor based upon the rotational speed $\omega_R$ by means of the above described toothed gear 23 or the like, is measured by the timer incorporated in the microcomputer 38. The microcomputer 38 derives an interval $\Delta T_F^{(k)} = t_F^{(k)} - t_F^{(k-1)}$, which is the time interval between the time $t_R^{(k)}$ at pulse k and the time $t_F^{(t-1)}$ at pulse (k−1). The rotational speed $N_F^{(k)}$ (28) and the rotational acceleration $\dot{N}_F^{(k)}$ (101) at pulse k are derived by using the method described with reference to FIG. 3. For calculating the rotational acceleration $\dot{N}_F^{(k)}$ at pulse k, the forward difference technique $\dot{N}_F^{(k)} = (N_F^{(k)} - N_F^{(k-1)})/\Delta T_F^{(k)}$ using the rotational speed $N_F^{(k)}$ obtained at pulse k and the rotational speed $N_F^{(k-1)}$ obtained at pulse (k−1) is employed in FIG. 1. Instead of this, however, a central difference technique represented by the equation $\dot{N}_F(k) = (N_F^{(k+1)} - N_F^{(k-1)})/(\Delta T_F^{(k)} + \Delta T_F^{(k-1)})$, where $N_F^{(k+1)}$ is the rotational speed at pulse (k+1) and $N_F^{(k-1)}$ is the rotational speed at pulse (k−1), may be employed as described before. The backward difference technique or the threepoint interpolation may also be employed. Or it is possible to adopt the above described detection scheme according to FIG. 4 and calculate $\dot{N}_F^{(k)} = (N_F^{(k+1)} - N_F^{(k-1)})/\Delta T_F^{(k)}$ by using the rotational speed $N_F^{(k+1)}$ obtained at pulse (k+1), the rotational speed $N_F^{(k-1)}$ obtained at pulse (k−1), and the pulse time-interval $\Delta T_F^{(k)}$. However, it should be noted that the rotational acceleration $\dot{N}_F^{(k)}$ at pulse k is decided after the rotational speed $N_F^{(k+1)}$ at pulse (k+1) is decided and this scheme becomes possible only in a control system having dead time equivalent to one revolution.

The rotational speed $N_F^{(k)}$ (28) and $\dot{N}_F^{(k)}$ (101) thus derived are respectively fed back compared with the commanded speed $N_c$ and the commanded acceleration $\dot{N}_c$, respectively resulting in deviation $\Delta N^{(k)}$ (102) and $\Delta \dot{N}^{(k)}$ (103). (When $N_c$ = constant, $\dot{N}_c = 0$.) The torque control system functions to apply PI (proportional integration) control operation to respective deviations so that respective deviations may become equal to zero. That is to say, a commanded current value $i_c^{(k)}$ (104) at pulse k supplied from the microcomputer defining the electromagnetic output torque of the motor element is calculated as $$i_c^{(k)} = k_{nc} \cdot \left( k_{pn} + \frac{K_{In}}{S} \right) \Delta N^{(k)} + K_{na} \cdot \left( K_{pa} + \frac{K_{Ia}}{S} \right) \Delta \dot{N}^{(k)}$$

The first term represents a manipulated variable for the speed deviation $\Delta N^{(k)}$, whereas the second term represents a manipulated variable for the acceleration deviation $\Delta \dot{N}^{(k)}$. $K_{pn}$, $K_{pa}$, $K_{In}$ and $K_{Ia}$ represent proportional gains and integral gains of speed deviation and acceleration deviation, respectively. $K_{nc}$ and $K_{na}$ are conversion constants for converting the sum of the proportional value and deviation and the acceleration deviation into commanded current values, respectively. From the commanded current value $i_{chu\,(k)}$ thus derived, the electromagnetic torque $T_M^{(k)}$ (105) of the motor element at pulse k is defined by the equation $T_M^{(k)} = K_{DA} \cdot K_T \cdot i_c^{(k)}$, where $K_{DA}$ is a D/A conversion constant between a digital value within the microcomputer and its analog output, and $K_T$ is a current-torque conversion constant (torque constant).

Figure 9A:
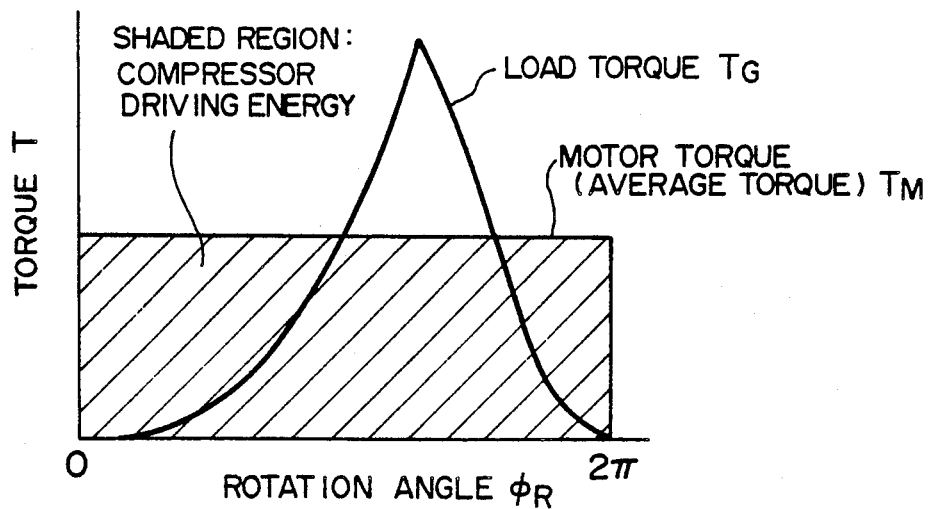
FIGS. 9A and 9B are diagrams for explaining the operation of the present invention.
Figure 9B:
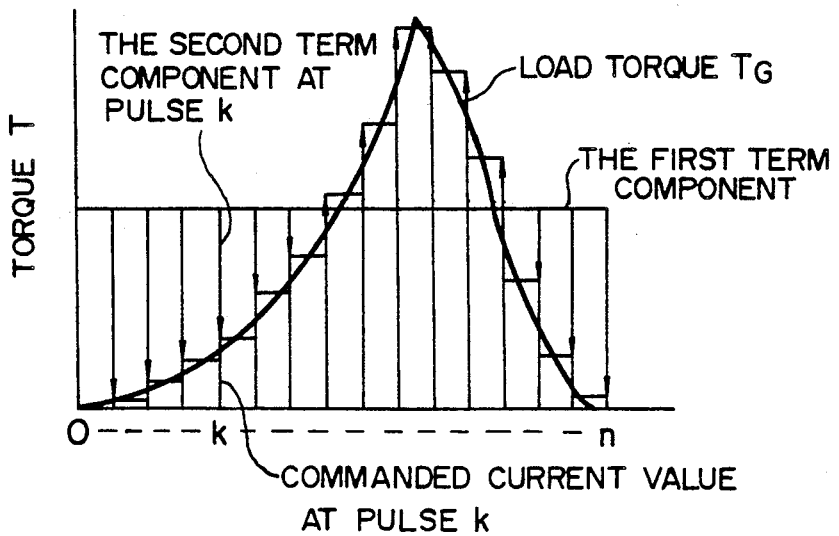

The physical meaning of the above described equation will now be described. FIG. 9A shows a current of the load torque $T_G$ during one rotation and a curve of the electromagnetic torque $T_M$ obtained when the torque is not controlled. The shaded region surrounded by the curve $T_M$ and axes of ordinate and abscissa represents energy required for driving the compressor during one revolution. It is possible to make the average of the rotational speed of the compressor equal to the commanded speed $N_c$ by making the area surrounded by the electromagnetic torque curve equal to the area surrounded by the load torque curve. The first term of the above described equation corresponds to this magnitude and corresponds to a, direct current component of the current supplied to the motor element. In order to prevent the rotation pulsation at each rotation angle, the load torque curve must be made to coincide with the load torque curve. The second term of the above described equation represents the magnitude for this purpose (and hence it changes to a positive value or a negative value at each rotation angle). The second term corresponds to an alternating current component of the current. (Refer to FIG. 9B.)

Figure 6:
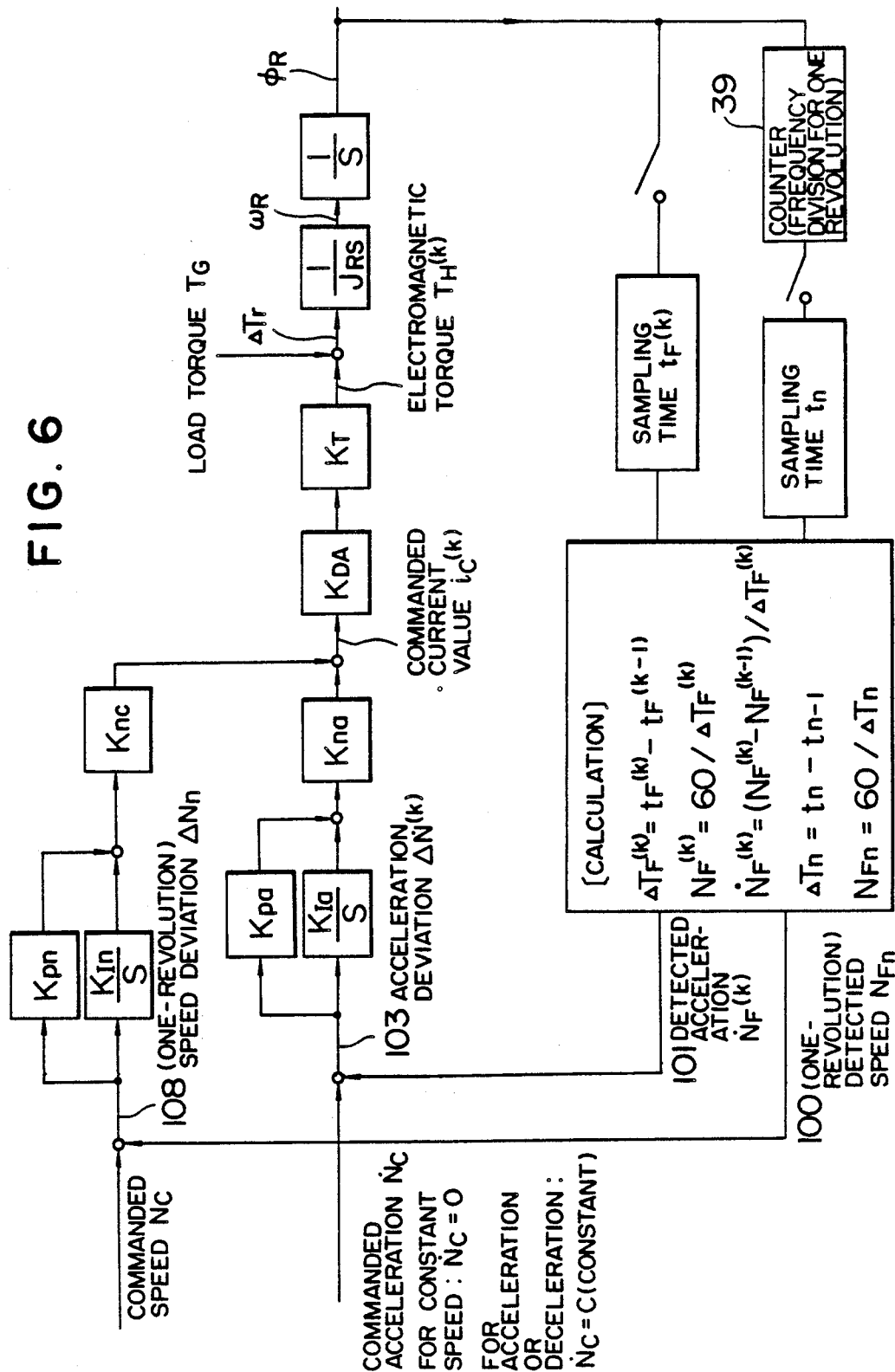
FIGS. 6, 7 and 8 are control block diagrams of second, third and fourth embodiments of the present invention, respectively.

FIG. 6 shows a second embodiment of the torque control apparatus according to the present invention. As for the control of the rotational speed, it only is necessary that the average speed during one rotation equal to the commanded speed. In FIG. 6, therefore, the rotational speed is detected and controlled once per rotation. As for the rotational speed, the above described rotational pulse signal 25 generated during a revolution of the rotor undergoes frequency division in a counter 39 to produce an input of one pulse per revolution. From difference $\Delta T_n$ between time $t_n$ of this input of one pulse per revolution at pulse n (i.e., at n-th revolution of the rotor) and time $t_{n-1}$ at pulse (n−1) (i.e., at (n−1)th revolution of the rotor), a detected speed $N_{Fn}$ corresponding to the average speed during one revolution is calculated. This detected speed $N_{Fn}$ (100) is fed back and compared with the commanded speed $N_c$ to produce one-revolution speed deviation $\Delta N_n$ (108). On the basis of this deviation, the speed is controlled. The detection-control system of acceleration functions in the same way as FIG. 1.

Figure 7:
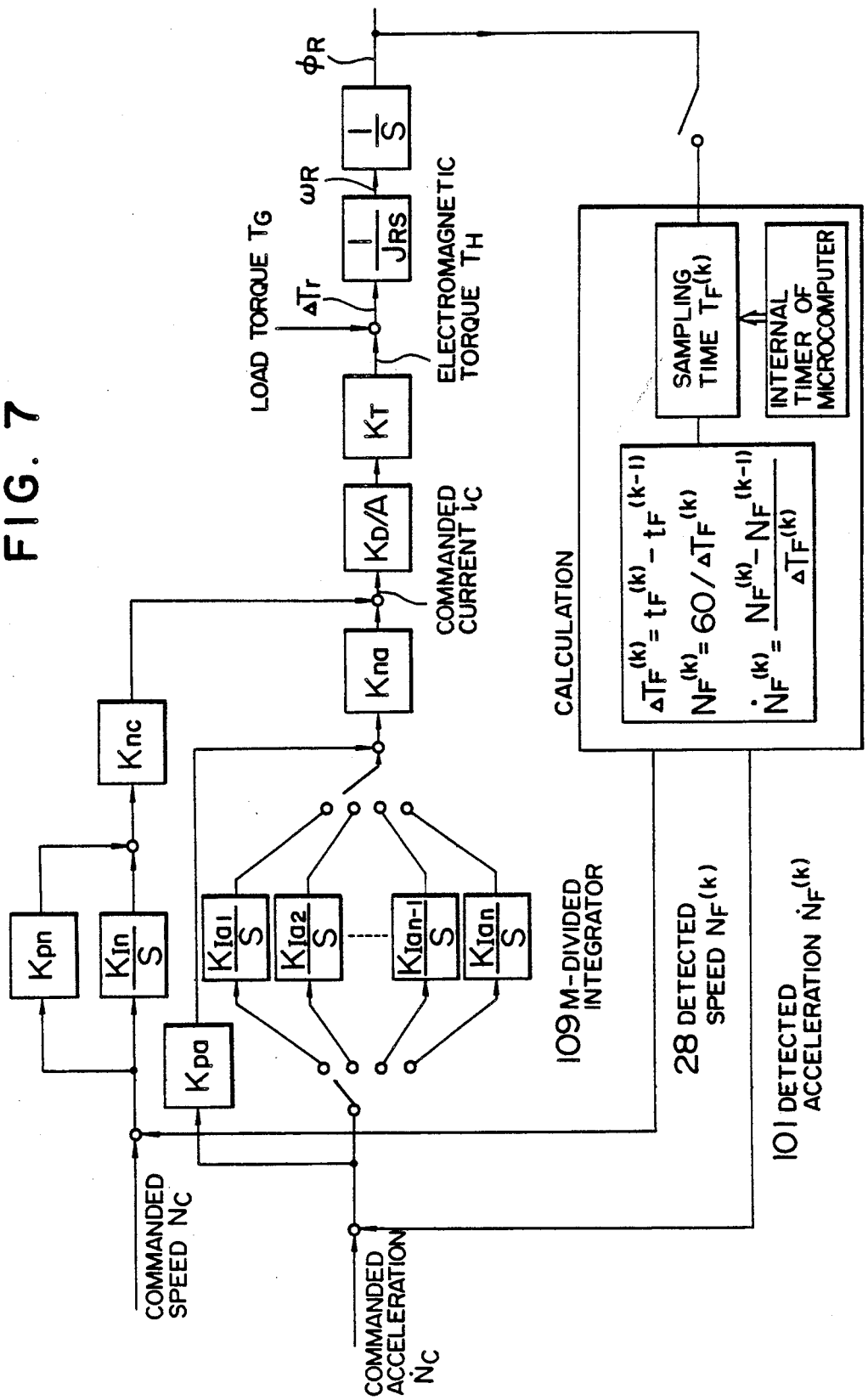

FIG. 7 shows a third embodiment of the present invention. When the number of pulses of the above described rotational pulse signal 25 during one revolution is n, n integrators (109) for performing integration control with respect to acceleration deviation are provided and changed over to be used for every pulse input of the rotational pulse signal 25. As a result, each integrator (109) corresponds to each rotation angle and integrates past rotational acceleration deviation inputs at the same angle independently of other angles. This is effective in case where the change of the load torque has periodicity.

Figure 8:
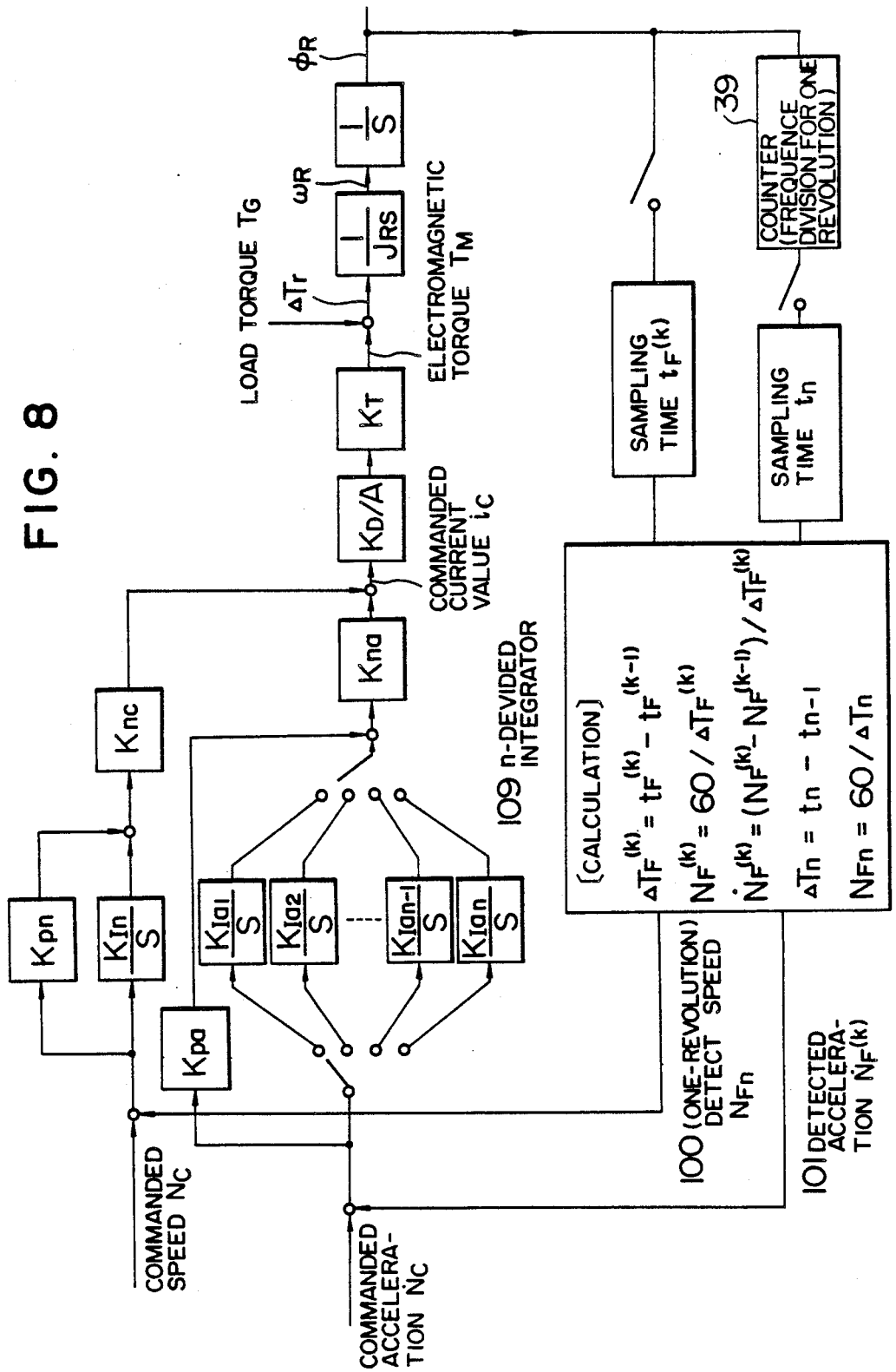

FIG. 8 shows a fourth embodiment, which uses feedback of the one-revolution average detected rotational speed (100) of FIG. 6 instead of feedback of the detected rotational speed $N_F^{(k)}$ (28) in FIG. 7. Remaining portions are the same as those of the embodiment of FIG. 7.

In each of the embodiments heretofore described, rotational acceleration at each rotation angle during one revolution is fed back at each rotation angle during the same revolution. In other words, rotational acceleration at each rotation angle during the present revolution is fed back at the same rotation angle during the present revolution. Thus, real-time feedback is performed. In an embodiment described below, however, rotational acceleration at each rotation angle during one revolution is fed back at the same rotation angle during its immediately succeeding revolution in case of a load torque assuming a periodical change repeatedly.

The entire configuration of the torque control apparatus of this embodiment will now be described by referring to FIG. 5. The detected signal obtained in the position detection sensor 23 is converted into the rotational pulse signal 25 by the waveform shaping circuit 29. The rotational pulse signal is sent to the CPU 31 within the microcomputer 38 via the interface 30. Upon the appearance at the rotational pulse signal 25, the microcomputer 38 starts interruption and carries out a series of operations comprising detection, calculation and commanding. The microcomputer clocks the pulse interval of the rotational pulse signal 25 by using its interval timer, derives the time interval $T_i$ of FIG. 3, and calculates the rotational speed $N_i$ and the rotational acceleration $\dot{N}_i$ therefrom. And the microcomputer 38 calculates a commanded current value to be supplied to the motor element 20 of the compressor, which is required to make the rotational acceleration $\dot{N}_i$ equal to zero and make the rotational speed $N_i$ equal to the commanded speed $N_c$. The commanded current value thus calculated is stored in a RAM 32 until the datum becomes necessary. Succeedingly, the datum stored into the RAM one revolution before is read out into the CPU 31 and sent to the control unit 34 to produce a chopper signal for driving the base driver 35. On the basis of the current control operation of the base driver 35, the inverter 37 controls the winding current to be supplied to the motor element 20, torque control being performed. The control is continuously performed so that the rotational speed of the compressor may always be equal to the commanded speed with a variation less than a certain allowance and the rotational acceleration of the rotor may become minimum. A series of these control loops are written into the ROM 33 beforehand.

Figure 10:
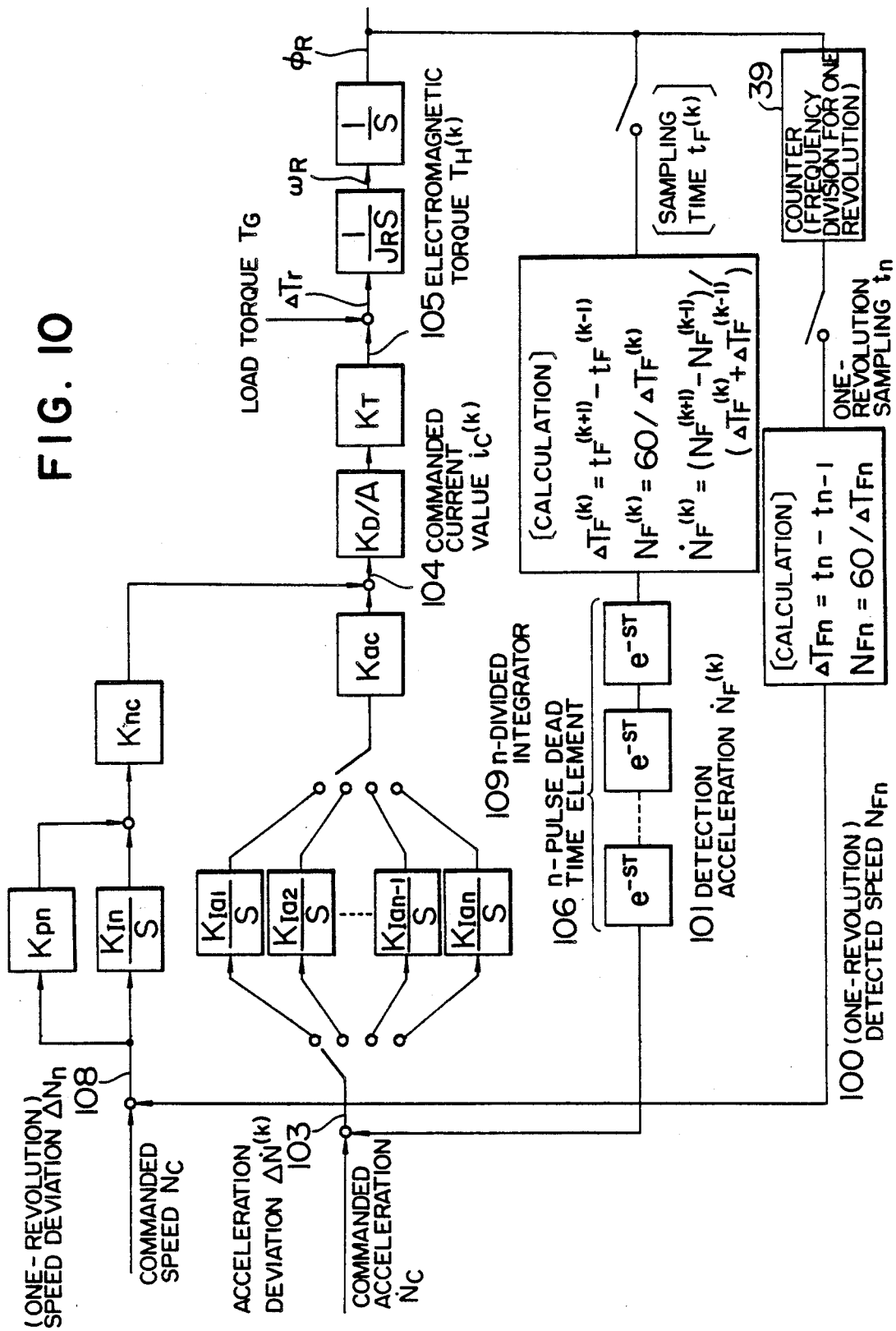
FIG. 10 is a control block diagram of a further embodiment of the present invention.

The control flow of this control circuit system will now be described in detail by referring to a block diagram shown in FIG. 10. In FIG. 10, S denotes a Laplace operator, 1/S an integral element, and $e^{-ST}$ a dead time element of time T. The load torque $T_G$ of the compressor functions as a disturbance with respect to the electromagnetic torque TM of the motor element. The residual torque $T_M - T_G = \Delta T_r$ becomes the excitation torque. The rotational speed $\omega R$ varies in accordance with the relation $$\omega_R = \frac{1}{J_R S} \Delta T_r.$$

Time $t_F^{(k)}$ of pulse k of the above described rotational pulse signal 25, which is obtained by sampling the rotation angle position $\phi_R$ of the rotor based upon the rotational speed $\omega_R$ by means of the above described toothed gear 23 or the like is measured. The microcomputer 38 derives the interval $\Delta T_F^{(k)} = t_F^{(k)} - t_F^{(k-1)}$, which is the time interval between the time $t_F^{(k)}$ at pulse k and the time $t_F^{(k-1)}$ at pulse (k−1). The rotational speed $N_F^{(k)}$ at pulse k is then derived by using the method described before with reference to FIG. 3. By using the rotational speed $N_F^{(k)}$ thus derived, the rotational acceleration $\dot{N}_F^{(k)}$ is derived, For calculating the acceleration $\dot{N}_F(k)$ at pulse k, the forward difference technique represented by the relation $\dot{N}_F^{(k)} = (N_F^{(k+1)} - N_F^{(k-1)}) / (\Delta T_F^{(k)} + \Delta T_F^{(k-1)})$ using the rotational speed $N_F^{(k+1)}$ obtained at pulse (k+1) and the rotational speed $N_F^{(k-1)}$ obtained at pulse (k−1) is employed in FIG. 10. As described before, however, the forward difference equation $\dot{N}_F^{(k)} = (N_F^{(k)} - N_F^{(k-1)}) / \Delta T_F^{(k)}$, the backward difference equation, the three-point interpolation, or the like may also be employed. Or the rotational acceleration $\dot{N}_F^{(k)}$ at pulse k may also be derived by using the method described with reference to FIG. 4. In the same way as the embodiment of FIG. 6, the number n of pulses obtained during one revolution of the rotor undergoes frequency division in the counter 39 to perform sampling at a rate of one pulse per revolution. From the pulse time $t_n$ of the n-th revolution and time $t_{n-1}$ of the (n'1)th revolution, $\Delta T_{Fn} = t_n - t_{n-1}$ is derived. And the rotational speed $N_{Fn} = 60/\Delta T_{Fn}$ (100) corresponding to the average speed during one revolution is calculated.

The rotational speed $N_{Fn}$ (100) and the rotational acceleration $\dot{N}_F^{(k)}$ (101) are fed back and compared respectively with the commanded speed $N_c$ and the commanded acceleration $\dot{N}_c$. (In steady state running with $N_c$=constant, $\dot{N}_c$=0.) The speed deviation $\Delta N_n$ (108) and the acceleration deviation $\Delta \dot{N}_F^{(k)}$ (103) are thus obtained, respectively. In the present embodiment, however, the acceleration $\dot{N}_F^{(k)}$ at the k-th pulse in the n-th revolution is fed back via n dead time elements e-st (106) as shown in FIG. 9 so as to be fed back at the same angle in the immediately succeeding revolution (i.e., at the k-th pulse in the (n+1)th revolution) to utilize the periodicity of the variation. Further, n integrators $$\frac{K_{Ia1}}{S}, \frac{K_{Ia2}}{S} \cdots \frac{K_{Ian}}{S}$$

(109) are provided for the acceleration deviation $\Delta \dot{N}_F^{(k)}$ as shown in FIG. 10. In the same way as the embodiment of FIG. 7, these integrators are changed over to operate pulse input by pulse input. It is thus possible to make each integrator operate independently in response to each rotation angle during one revolution. As a result, the commanded current value $i_c^{(k)}$ (104) at pulse k in the n-th revolution is calculated in accordance with the relation $$i_{c,n}^{(k)} = K_{nc} \cdot \left( K_{nn} + \frac{K_{In}}{S} \right) \Delta N_n + K_{ac} \cdot \frac{K_{Ia,k}}{S} \cdot \Delta \dot{N}_{n-1}^{(k)}.$$

The first term represents a manipulated variable for the speed deviation $\Delta N_n$ and is controlled by PI (proportional integration) control. The second term represents a manipulated variable for the acceleration deviation $$\Delta \dot{N}_{n-1}^{(k)}$$

at the k-th pulse in the (n-1)th revolution and is controlled by I (integration) control. In FIG. 10, a term of proportional control may be added to the acceleration control system. In FIG. 10, $K_{pn}$ and $K_{In}$ are the proportional gain and integral gain of the speed feedback system, respectively. And $K_{nc}$ is a conversion constant for converting the sum of the proportional value and integral value of speed deviation into a commanded current value. In the same way, $K_{Ia1}$ to $K_{Ian}$ are integral gains of the first pulse to the n-th pulse, and $K_{ac}$ is a conversion constant between an integral value of acceleration deviation and a commanded current value.

Figure 11:
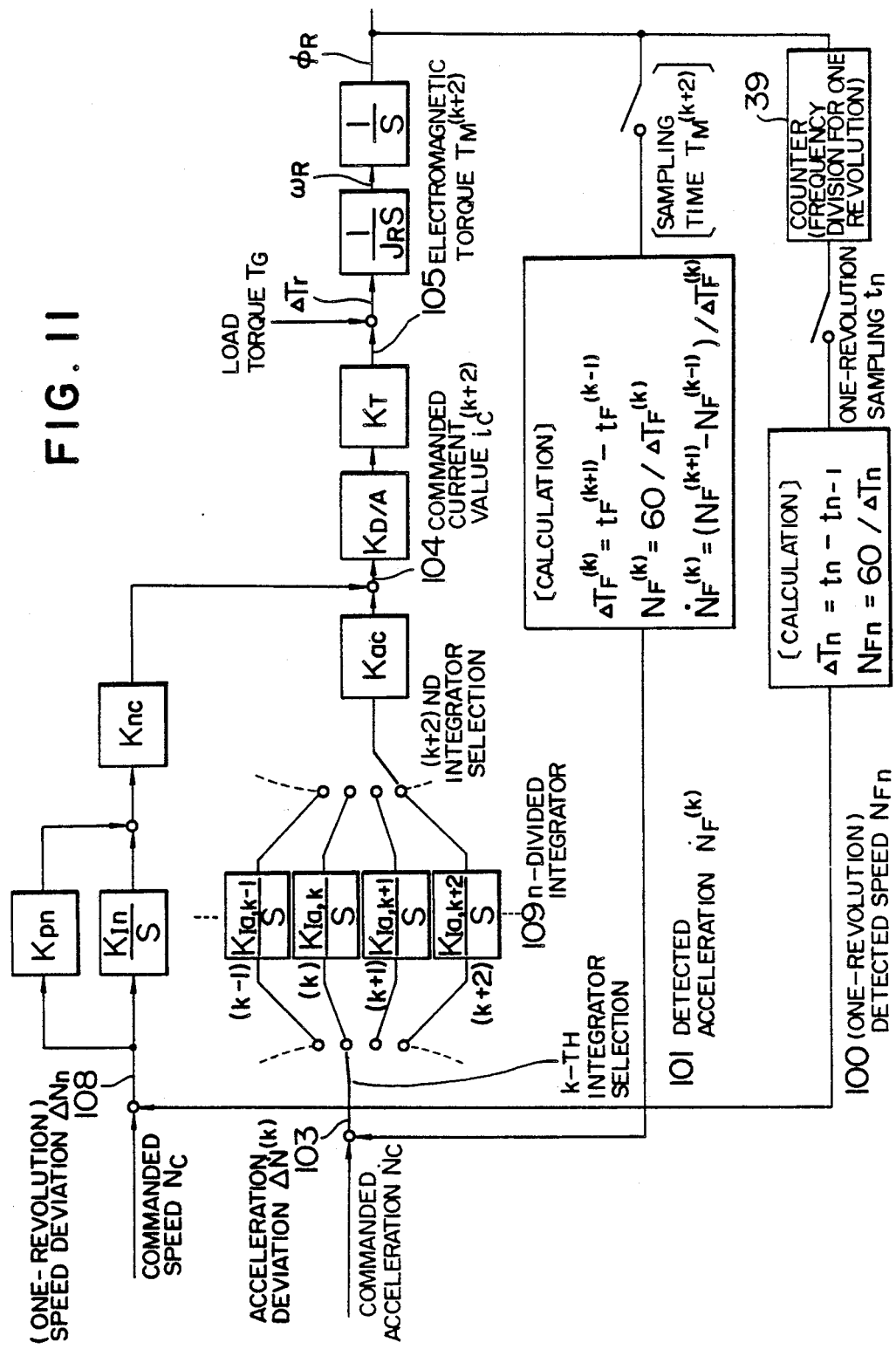
FIG. 11 is a configuration diagram of a control system using the acceleration detecting method shown in FIG. 4.

FIG. 11 shows an example of configuration of a control system using an acceleration detection method shown in FIG. 4. As described before, the rotational acceleration $\dot{N}_F^{(k)}$ at pulse k is defined after the rotational speed $N_F^{(k+1)} = 1/t_F^{(k+1)}$ at pulse (k+1) is defined. Further, it takes calculation time to actually perform calculation in the microcomputer. In FIG. 11, therefore, $N_F^{(k)}$ is fed back when pulse (k+2) is sampled. When $\dot{N}_F^{(k)}$ is fed back in FIG. 11, the (k+2)-nd integrator of the n-divided integrator sends out its output. This output is added to the output of the average speed loop to produce a commanded current value $i_c^{(k)}$ for pulse k.

Figure 12:
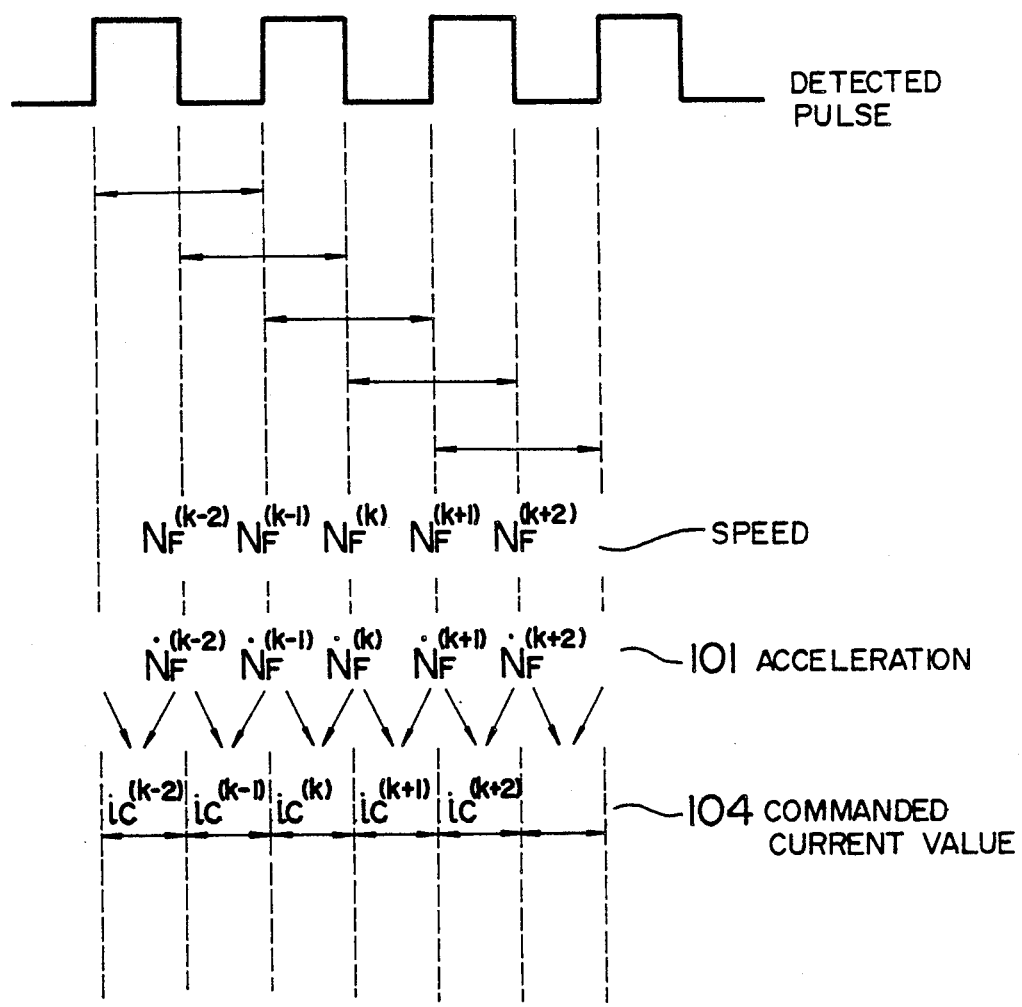
FIG. 12 is a diagram showing the position relationship between the rotational acceleration and a commanded current value of FIG. 11.

FIG. 12 shows the positional relation between the rotational acceleration $\dot{N}_F^{(k)}$ and the commanded current value $i_c^{(k)}$. Whereas the rotational speed $N_F^{(k)}$ and the rotational acceleration $\dot{N}_F^{(k)}$ are values measured when the pulse k is detected because of the use of difference method, the commanded current value $i_c^{(k)}$ is an output value of a time section ranging from detection of pulse (k−1) to detection of pulse k. As detected acceleration to be reflected into the commanded current value $i_c^{(k)}$, for example, therefore, two kinds, i.e., $\dot{N}_F^{(k-1)}$ and $\dot{N}_F^{(k)}$ can be considered.

In a first method, the acceleration reflected into the commanded current value $i_c^{(k)}$ is defined by the average of values at pulse (k−1) and at pulse k as $$i_{c,n}^{(k)} = K_{nc} \cdot \left( K_{pn} + \frac{K_{In}}{S} \right) \Delta N_n +$$

$$K_{ac} \cdot \frac{K_{Ia,k}}{S} \cdot \frac{\Delta \dot{N}_{n-1}^{(k)} + \Delta \dot{N}_{n-1}^{(k-1)}}{2}.$$

In a second method, attention is paid to acceleration $\dot{N}_F^{(k)}$ at pulse k (where acceleration deviation $\Delta \dot{N}^{(k)} = -\dot{N}_F^{(k)}$), and conditions are laid down to reflect it into either $i_c^{(k)}$ or $i_c^{(k+1)}$.

For example, it is determined whether $\dot{N}_F^{(k)} \geq 0$ or $\dot{N}_F^{(k)} < 0$. When $\dot{N}_F^{(k)} > 0$ ($\Delta \dot{N}^{(k)} < 0$), $\Delta \dot{N}^{(k)}$ is added to larger one of $i_c^{(k)}$ and $i_c^{(k+1)}$. When $\dot{N}_F^{(k)} < 0$ ($\Delta \dot{N}^{(k)} > 0$), $\Delta \dot{N}^{(k)}$ is added to smaller one of $i_c^{(k)}$ and $i_c^{(k+1)}$. Especially when a detection error is included in a detected pulse, this method is effective in reducing this error.

Figure 13A:
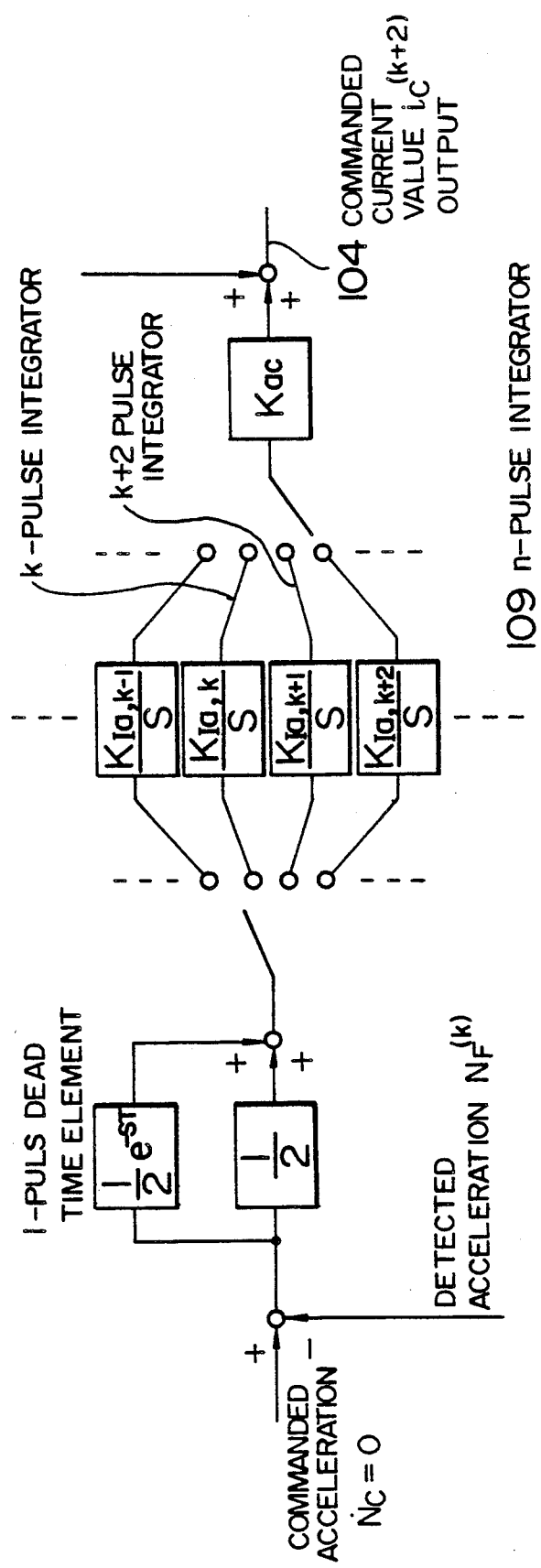
FIGS. 13A and 13B show first and second methods of FIG. 12.
Figure 13B:
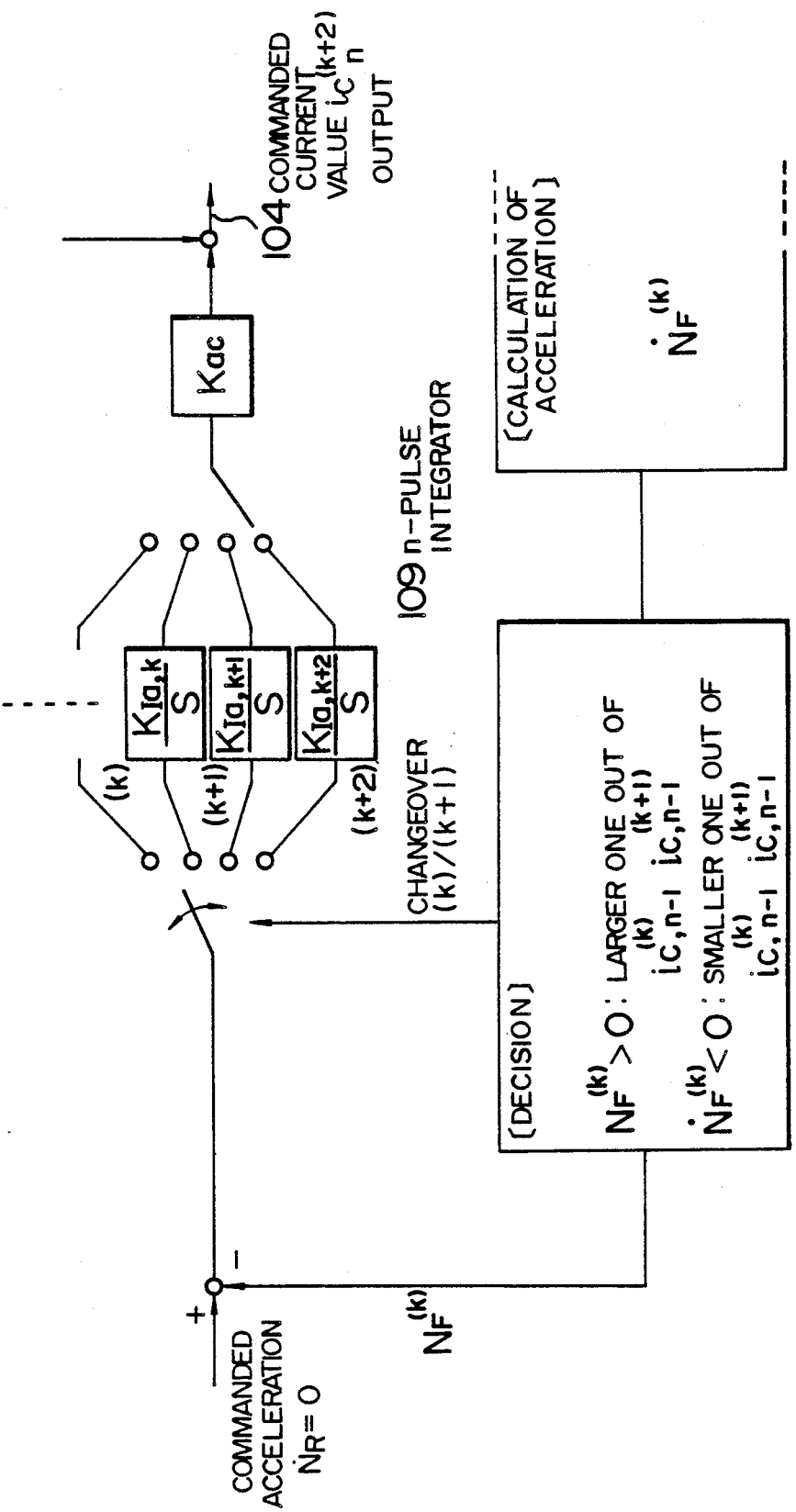

FIGS. 13A and 13B show these two methods, respectively.

From the commanded current value $i_c^{(k)}$ (104) at pulse k in the n-th revolution thus derived, the electromagnetic torque of the motor element is defined by the relation $T_M^{(k)} = K_{D/A} \cdot K_T i_c^{(k)}$, where $K_{D/A}$ is a D/A conversion constant between a digital quantity in the microcomputer and the analog output, and $K_T$ is a current-torque conversion constant (torque constant).

The physical meaning of the above described equation will now be described. In FIG. 9A showing the curve of the load torque $T_G$ during one rotation and the curve of the electromagnetic torque $T_M$ obtained when the torque is not controlled, the region surrounded by the curve TM and axes of ordinate and abscissa represents energy required for driving the compressor during one revolution. It is possible to make the average of the rotational speed of the compressor equal to the commanded speed $N_c$ by making the area surrounded by the electromagnetic torque curve equal to the area surrounded by the load torque curve. The first term of the above described equation corresponds to this magnitude and corresponds to a, direct current component of the current supplied to the motor element. In order to prevent the rotation pulsation at each rotation angle, the load torque curve must be made to coincide with the load torque curve. The second term of the above described equation represents the magnitude for this purpose (and hence it changes to a positive value or a negative value at each rotation angle). The second term corresponds to an, alternating current component of the current. (Refer to FIG. 9B.) The integral term in the second term represents the current output of the torque pulsation corresponding to each pulse detection position. The second term performs learning control repetitively for periodic variation in load torque. The commanded current value gradually approaches the pulsating load pattern.

Figure 14:
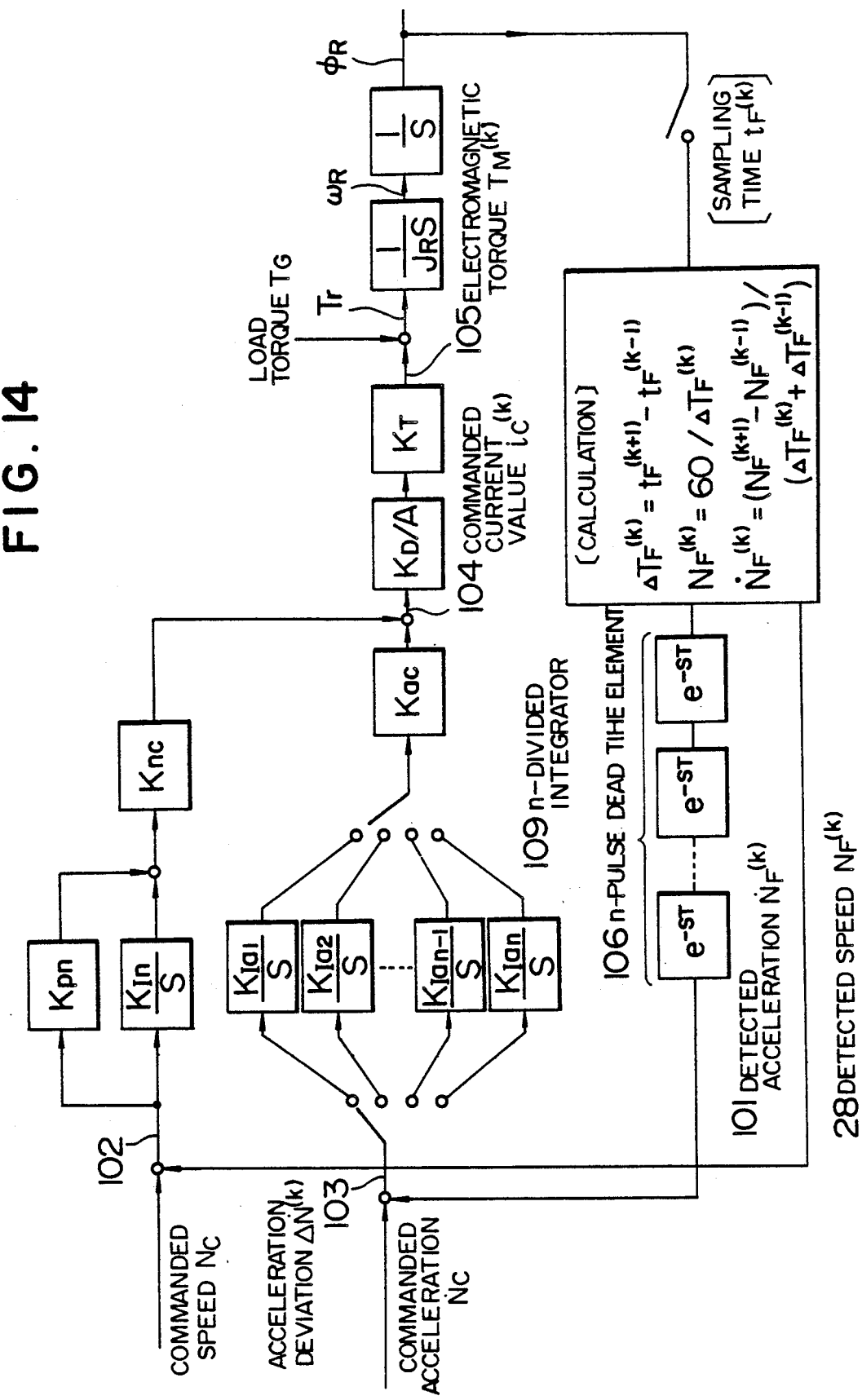
FIG. 14 is a control block diagram showing a further embodiment of the present invention.

FIG. 14 shows another embodiment of the present invention. In this embodiment, the rotational speed $N_F^{(k)}$ (28) at each rotation angle position in one revolution is derived and fed back instead of feedback of one-revolution average rotational speed $N_{Fn}$ (100) in FIG. 10. The detection-control system of acceleration is similar to that of FIG. 10.

Figure 15:
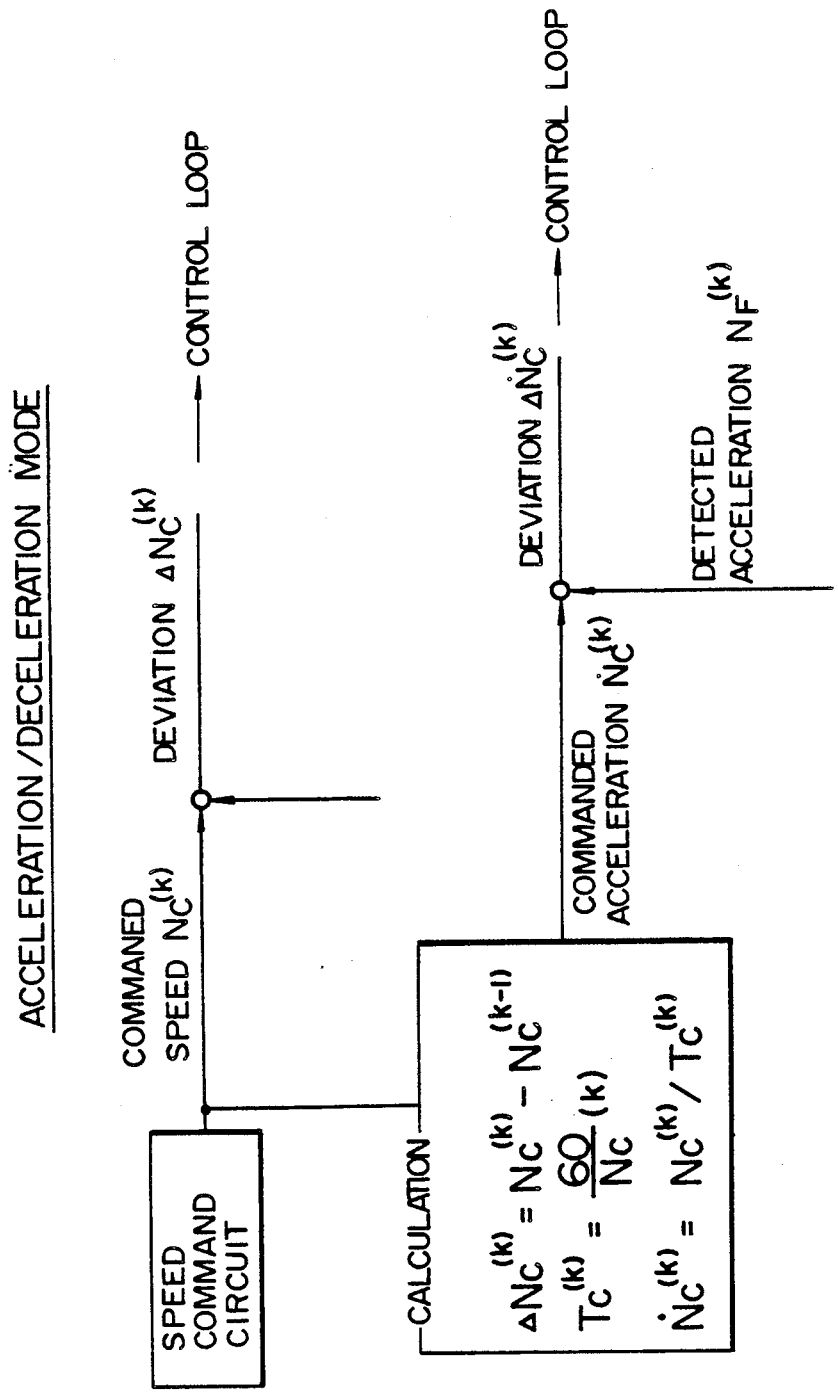
FIG. 15 shows means for defining acceleration to be commanded in acceleration or deceleration.

FIG. 15 shows a method for defining the acceleration command $N_c$ when the compressor is in the acceleration or deceleration state. In the case where the commanded speed $N_c^{(k)}$ at pulse k is different from the commanded speed $N_c^{(k-1)}$ at pulse (k−1), the compressor is in the acceleration or deceleration mode. In this case, the difference $\Delta N_c^{(k)} = N_c^{(k)} - N_c^{(k-1)}$ is derived. From the commanded speed $N_c^{(k)}$ at pulse k, the period $T_c^{(k)} = 60/N_c^{(k)}$ is calculated. By the relation $\dot{N}_c^{(k)} \Delta N_c^{(k)}/T_c^{(k)}$, the acceleration command $\dot{N}_c^{(k)}$ is obtained.

In the embodiments heretofore described, torque control is performed in case the motor element is driven by an inverter to run an enclosed rotary compressor. However, the present invention is not limited to this case, but can provide efficient torque control means for a general rotating motor machine driven by a motor element.

In a rotating motor machine having element driven by a motor element, it is evident from the description heretofore made that the present invention eliminates the mismatching between the electromagnetic torque of the motor element and the variation of the load torque, reduces the excitation torque largely, and hence reduces largely the vibration caused in the rotation direction of the machine. Further, the response of he control system can be further quickened, and hence the torque control execution region can be expanded into a higher-speed region, and the vibration can be reduced in a wide rotational speed region. As a result, the pressnt invention is also contributable to size reduction, power saving owing to a wide-range variable-speed running, and comfort improvement.

We claim:

1. A torque control apparatus for a rotating motor machine having a motor element and a load element coupled to said motor element via a rotational main shaft and driven to rotate by said motor element, said torque control apparatus comprising:
   means for detecting rotational acceleration of the rotational main shaft and providing an output indicative thereof; and
   control means, responsive to the output of the detecting means, for comparing the detected rotational acceleration with a commanded rotational acceleration and for controlling an electromagnetic torque of the motor element so that a deviation between the detected rotational acceleration and the commanded rotational acceleration is reduced toward zero, wherein said detecting means detects rotational acceleration at a plurality of rotational angles in one revolution of the rotational main shaft said control means including:
   feedback means for producing a feedback signal based on the rotational acceleration detected at each rotational angle in the one revolution of the rotational main shaft; and
   means, responsive to the feedback signal, for comparing each detected rotational acceleration with the commanded rotational acceleration to derive an acceleration deviation, whereby said control means controls the electromagnetic torque of the motor element so that the acceleration deviation is reduced toward zero.

2. A torque control apparatus for a rotating motor machine according to claim 1, said control means further including means for generating a position detection pulse for each of n-divided angles obtained by dividing one revolution of the rotational main shaft into n equal angles, said detection means detecting rotational acceleration in each divided angle section on the basis of an interval between the position detection pulses, said feedback means producing a feedback signal based on the rotational acceleration detected in each divided angle section, and said comparing means being responsive to said feedback signal for comparing each detected rotational acceleration with a commanded rotational acceleration in each divided angle section within the same revolution of the rotational main shaft as said one revolution.

3. A torque control apparatus for a rotating motor machine according to claim 2, further comprising:
   means for detecting rotational speed of the rotational main shaft, wherein said control means controls the electromagnetic torque of the motor element on the basis of an output of said speed detecting means indicative of at least one of a rotational speed at a current rotation angle of the rotational main shaft and an average rotational speed in one revolution of said rotational main shaft, in addition to said rotational acceleration detected by said detecting means.

4. A torque control apparatus for a rotating motor machine according to claim 2, wherein said control means includes a plurality of acceleration control calculation areas corresponding to respective n-divided angles for processing said acceleration deviation, whereby a different control calculation area is selected upon every generation of a position detection pulse so that each acceleration control calculation area is utilized independently of other control calculation areas.

5. A torque control apparatus for a rotating motor machine according to claim 4, further comprising:
means for detecting rotational speed of the rotational main shaft, wherein said control means controls the electromagnetic torque of the motor element on the basis of an output of said speed detecting means indicative of at least one of a rotational speed at a current rotation angle of the rotational main shaft and an average rotational speed in one revolution of said rotational main shaft, in addition to said rotational acceleration detected by said detecting means.

6. A torque control apparatus for a rotating motor machine according to claim 1, wherein said control means controls the electromagnetic torque of the motor element on the basis of an output of a speed detector indicative of at least one of a rotational speed at a current rotation angle of the rotational main shaft and an average rotational speed in one revolution of said rotational main shaft, in addition to said rotational acceleration detected by said detecting means.

7. A torque control apparatus for a rotating motor machine according to claim 1, further comprising:
means for detecting rotational speed of the rotational main shaft, wherein said control means controls the electromagnetic torque of the motor element on the basis of an output of said speed detecting means indicative of at least one of a rotational speed at a current rotation angle of the rotational main shaft and an average rotational speed in one revolution of said rotational main shaft, in addition to said rotational acceleration detected by said detecting means.

8. A torque control apparatus for a rotating motor machine having a motor element and a load element coupled to said motor element via a rotational main shaft and driven to rotate by said motor element, said torque control apparatus comprising:
means for detecting rotational acceleration of the rotational main shaft and providing an output indicative thereof; and
control means, responsive to the output of the detecting means, for comparing the detected rotational acceleration with a commanded rotational acceleration and for controlling an electromagnetic torque of the motor element so that a deviation between the detected rotational acceleration and a commanded rotational acceleration is reduced toward zero; and
wherein said detecting means detects rotational acceleration at a plurality of rotational angles in one revolution of the rotational main shaft, said control means including:
feedback means for producing a feedback signal at a corresponding rotation angle in the next revolution of the rotational main shaft based on the rotational acceleration detected at each rotation angle in said one revolution of the rotational main shaft; and
means, responsive to the feedback signal, for comparing each detected rotational acceleration with the commanded rotational acceleration to derive an acceleration deviation, whereby said control means controls the electromagnetic torque of the motor element so that the acceleration deviation is reduced toward zero.

9. A torque control apparatus for a rotating motor machine according to claim 8, said control means further including means for generating a position detection pulse for each of n-divided angles obtained by dividing one revolution of the rotational main shaft into n equal angles, said detection means detecting rotational acceleration in each divided angle section on the basis of an interval between the position detection pulses, said feedback means producing a feedback signal based on the rotational acceleration detected in each divided angle section, and said comparing means being responsive to said feedback signal for comparing each detected rotational acceleration with a commanded rotational acceleration in the same divided angle section in the next revolution of the rotational main shaft.

10. A torque control apparatus for a rotating motor machine according to claim 9, wherein said control means includes a plurality of acceleration control calculation areas corresponding to respective n-divided angles for processing said acceleration deviation, whereby a different control calculation area is selected upon every generation of a position detection pulse so that each acceleration control calculation area is utilized independently of other control calculation areas.

11. A torque control apparatus for a rotating motor machine according to claim 8, further comprising:
means for detecting rotational speed of the rotational main shaft, wherein said control means controls the electromagnetic torque of the motor element on the basis of an output of said speed detecting means indicative of at least one of a rotational speed at a current rotation angle of the rotational main shaft and an average rotational speed in one revolution of said rotational main shaft, in addition to said rotational acceleration detected by said detecting means.

12. A torque control apparatus for a rotating motor machine according to claim 9, further comprising:
means for detecting rotational speed of the rotational main shaft, wherein said control means controls the electromagnetic torque of the motor element on the basis of an output of said speed detecting means indicative of at least one of a rotational speed at a current rotation angle of the rotational main shaft and an average rotational speed in one revolution of said rotational means shaft, in addition to said rotational acceleration detected by said detecting means.

13. A torque control apparatus for a rotating motor machine having a motor element and a load element coupled to said motor element via a rotational main shaft and driven to rotate by said motor element, said torque control apparatus comprising:
means for detecting rotational acceleration of said main shaft and producing an output indicative thereof;
means for detecting rotational speed of said main shaft and producing an output indicative thereof;
means, responsive to said outputs of said rotational speed detecting means and said rotational acceleration detecting means, for controlling an electromagnetic torque of the motor element so that the difference between the rotational acceleration and a predetermined rotational acceleration value and the difference between the rotational speed and a predetermined rotational speed value are respectively reduced toward zero.

* * * * *